(12) United States Patent
Li et al.

(10) Patent No.: US 10,929,452 B2
(45) Date of Patent: Feb. 23, 2021

(54) MULTI-DOCUMENT SUMMARY GENERATION METHOD AND APPARATUS, AND TERMINAL

(71) Applicant: Huawei Technologies Co., Ltd., Shenzhen (CN)

(72) Inventors: Piji Li, Hong Kong (CN); Zhengdong Lu, Shenzhen (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/688,090

(22) Filed: Nov. 19, 2019

(65) Prior Publication Data

US 2020/0081909 A1    Mar. 12, 2020

Related U.S. Application Data

(63) Continuation of application No. PCT/CN2017/116658, filed on Dec. 15, 2017.

(30) Foreign Application Priority Data

May 23, 2017    (CN) .......................... 201710369694.X

(51) Int. Cl.
  *G06F 3/048*    (2013.01)
  *G06F 16/34*    (2019.01)
  (Continued)

(52) U.S. Cl.
  CPC ............ *G06F 16/345* (2019.01); *G06F 17/16* (2013.01); *G06F 40/211* (2020.01); *G06F 40/289* (2020.01); *G06N 20/00* (2019.01)

(58) Field of Classification Search
  None
  See application file for complete search history.

(56) References Cited

U.S. PATENT DOCUMENTS 6,546,379 B1    4/2003    Hong et al.
7,788,191 B2 *  8/2010    Jebara ...................... G06T 9/00
                                                                706/12
(Continued)

FOREIGN PATENT DOCUMENTS

CN    101008941 A    8/2007
CN    101398814 A    4/2009
(Continued)

OTHER PUBLICATIONS

Machine Translation and Abstract of Chinese Publication No. CN102411621, Apr. 11, 2012, 27 pages.
(Continued)

*Primary Examiner* — Hua Lu
(74) *Attorney, Agent, or Firm* — Conley Rose, P.C.

(57) ABSTRACT

A multi-document summary generation method includes obtaining a candidate sentence set, training each candidate sentence in the candidate sentence set using a cascaded attention mechanism and an unsupervised learning model in a preset network model, to obtain importance of each candidate sentence, selecting, based on the importance of each candidate sentence, a phrase that meets a preset condition from the candidate sentence set as a summary phrase set, and obtaining a summary of a plurality of candidate documents based on the summary phrase set.

20 Claims, 7 Drawing Sheets

(51) Int. Cl.
  *G06N 20/00*  (2019.01)
  *G06F 40/211*  (2020.01)
  *G06F 40/289*  (2020.01)
  *G06F 17/16*  (2006.01)

(56) References Cited

U.S. PATENT DOCUMENTS

| | | | | |
|---|---|---|---|---|
| 7,965,875 | B2* | 6/2011 | Ionita | G06K 9/621 382/118 |
| 8,473,430 | B2* | 6/2013 | Yu | G06N 20/00 706/12 |
| 9,129,148 | B1* | 9/2015 | Li | G06K 9/52 |
| 9,256,617 | B2* | 2/2016 | Saxena | G06K 9/4652 |
| 9,842,105 | B2* | 12/2017 | Bellegarda | G06F 40/205 |
| 10,523,955 | B2* | 12/2019 | Wang | G06K 9/46 |
| 2002/0052901 | A1* | 5/2002 | Guo | G06F 16/345 715/247 |
| 2006/0251338 | A1* | 11/2006 | Gokturk | G06F 16/583 382/305 |
| 2010/0299303 | A1* | 11/2010 | Horster | G06F 16/3346 706/52 |
| 2012/0185415 | A1* | 7/2012 | Chenthamarakshan | G06F 16/355 706/12 |
| 2013/0151525 | A1* | 6/2013 | Ankan | G06F 40/30 707/737 |
| 2014/0236578 | A1* | 8/2014 | Malon | G06F 40/40 704/9 |
| 2015/0117766 | A1* | 4/2015 | Tickoo | G06K 9/6235 382/160 |
| 2016/0048741 | A1* | 2/2016 | Nguyen | G06K 9/00624 382/159 |
| 2016/0055410 | A1* | 2/2016 | Spagnola | G06N 3/02 706/16 |
| 2016/0140434 | A1* | 5/2016 | Yilmaz | G06N 3/0454 706/31 |
| 2016/0174902 | A1* | 6/2016 | Georgescu | G06T 7/0012 600/408 |
| 2017/0039765 | A1* | 2/2017 | Zhou | G06T 7/55 |
| 2017/0060826 | A1* | 3/2017 | Das | G06F 40/279 |
| 2017/0083623 | A1* | 3/2017 | Habibian | G06F 16/334 |
| 2017/0147944 | A1* | 5/2017 | Csurka | G06N 3/0454 |
| 2017/0161633 | A1* | 6/2017 | Clinchant | G06N 3/0454 |
| 2017/0238847 | A1* | 8/2017 | Inan | A61B 5/6823 |
| 2017/0256068 | A1* | 9/2017 | Wang | G06T 7/74 |
| 2017/0351786 | A1* | 12/2017 | Quattoni | G06F 30/20 |
| 2017/0364732 | A1* | 12/2017 | Komogortsev | G06K 9/00604 |
| 2018/0060698 | A1* | 3/2018 | Hua | G06K 9/623 |
| 2018/0107660 | A1* | 4/2018 | Wang | G06F 16/5854 |
| 2018/0158078 | A1* | 6/2018 | Hsieh | G06N 20/00 |
| 2018/0165554 | A1* | 6/2018 | Zhang | G06K 9/6256 |
| 2018/0254040 | A1* | 9/2018 | Droppo | G10L 17/18 |

FOREIGN PATENT DOCUMENTS

| | | |
|---|---|---|
| CN | 102043851 A | 5/2011 |
| CN | 102385574 A | 3/2012 |
| CN | 102411621 A | 4/2012 |
| CN | 103593703 A | 2/2014 |
| CN | 103853834 A | 6/2014 |
| CN | 103885935 A | 6/2014 |
| CN | 104156452 A | 11/2014 |
| CN | 104503958 A | 4/2015 |
| CN | 104778157 A | 7/2015 |
| CN | 104834735 A | 8/2015 |
| CN | 105005563 A | 10/2015 |
| CN | 105183710 A | 12/2015 |
| CN | 105320642 A | 2/2016 |
| CN | 105488021 A | 4/2016 |
| CN | 105930314 A | 9/2016 |
| CN | 106054606 A | 10/2016 |
| WO | 2015184768 A1 | 12/2015 |

OTHER PUBLICATIONS

Machine Translation and Abstract of Chinese Publication No. CN103853834, Jun. 11, 2014, 10 pages.
Machine Translation and Abstract of Chinese Publication No. CN103885935, Jun. 25, 2014, 17 pages.
Machine Translation and Abstract of Chinese Publication No. CN104156452, Nov. 19, 2014, 28 pages.
Machine Translation and Abstract of Chinese Publication No. CN104503958, Apr. 8, 2015, 20 pages.
Machine Translation and Abstract of Chinese Publication No. CN104778157, Jul. 15, 2015, 8 pages.
Machine Translation and Abstract of Chinese Publication No. CN104834735, Aug. 12, 2015, 15 pages.
Machine Translation and Abstract of Chinese Publication No. CN105005563, Oct. 28, 2015, 25 pages.
Machine Translation and Abstract of Chinese Publication No. CN105183710, Dec. 23, 2015, 9 pages.
Machine Translation and Abstract of Chinese Publication No. CN105320642, Feb. 10, 2016, 23 pages.
Machine Translation and Abstract of Chinese Publication No. CN105488021, Apr. 13, 2016, 28 pages.
Machine Translation and Abstract of Chinese Publication No. CN105930314, Sep. 7, 2016, 12 pages.
Foreign Communication From a Counterpart Application, PCT Application No. PCT/CN2017/116658, English Translation of International Search Report dated Mar. 22, 2018, 2 pages.
Foreign Communication From a Counterpart Application, PCT Application No. PCT/CN2017/116658, English Translation of Written Opinion dated Mar. 22, 2018, 3 pages
Rush, A., et al. "A Neural Attention Model for Abstractive Sentence Summarization," arXiv:1509.00685v2 [cs.CL], Sep. 3, 2015, 11 pages.
Cheng, J., et al. "Neural Summarization by Extracting Sentences and Words," arXiv:1603.07252v3 [cs.CL], Jul. 1, 2016, 11 pages.

\* cited by examiner

MULTI-DOCUMENT SUMMARY GENERATION METHOD AND APPARATUS, AND TERMINAL

CROSS-REFERENCE TO RELATED APPLICATIONS

This application is a continuation application of International Patent Application No. PCT/CN2017/116658, filed on Dec. 15, 2017, which claims priority to Chinese Patent Application No. 201710369694.X, filed on May 23, 2017 both of the aforementioned applications are hereby incorporated by reference in their entireties.

TECHNICAL FIELD

Embodiments of the present disclosure relate to the data processing field, and in particular, to a multi-document summary generation method and apparatus, and a terminal.

BACKGROUND

In an automatic Multi-Document Summarization (MDS) technology, a plurality of candidate documents of a same topic (for example, a news event) is used as input, and a summary text with a specific length is automatically generated as required by analyzing and processing the plurality of candidate documents, to describe a central idea of a news event to a maximum extent, thereby quickly and succinctly extracting important information of the news event.

In other approaches, a summary generation method is training a corpus using a deep neural network model to obtain a word vector representation of an eigenword, obtaining a candidate sentence set in the corpus based on a preset query word, obtaining semantic similarity between different candidate sentences in the candidate sentence set based on the word vector representation of the eigenword in order to obtain similarity between two candidate sentences and construct a sentence graph model, and calculating a weight of a candidate sentence after the sentence graph model is constructed, and finally generating a document summary using a maximal marginal relevance algorithm.

However, in the foregoing method, similarity between different candidate sentences in a candidate sentence set is calculated using a word vector representation of an eigenword. Consequently, accuracy of similarity between candidate sentences is directly affected when eigenword extraction is inaccurate, and there is a relatively large amount of redundancy information in a subsequently generated document summary.

SUMMARY

This application provides a multi-document summary generation method and apparatus, and a terminal in order to resolve problems in other approaches that an amount of redundancy information in a document summary generated is relatively large.

To achieve the foregoing objective, the following technical solutions are used in this application.

According to a first aspect, this application provides a multi-document summary generation method, including obtaining a candidate sentence set, where the candidate sentence set includes candidate sentences included in each of a plurality of candidate documents about a same event, training each candidate sentence in the candidate sentence set using a cascaded attention mechanism and an unsupervised learning model in a preset network model, to obtain importance of each candidate sentence, where importance of one candidate sentence corresponds to a modulus of one row vector in a cascaded attention mechanism matrix, the cascaded attention mechanism matrix is output in a process in which the preset network model optimizes a reconstruction error function using the unsupervised learning model, and the importance of the candidate sentence is used to indicate an importance degree of a meaning expressed by the candidate sentence in the plurality of candidate documents, selecting, based on the importance of each candidate sentence, a phrase that meets a preset condition from the candidate sentence set as a summary phrase set, and obtaining a summary of the plurality of candidate documents based on the summary phrase set.

This embodiment of the present disclosure provides a multi-document summary generation method. The cascaded attention mechanism and the unsupervised learning model in the preset network model are used to train each candidate sentence in the candidate sentence set to obtain the importance of each candidate sentence in the candidate sentence set. When a next status of a target sequence of the cascaded attention mechanism is generated, a source sequence may be considered for finding a basis segment, to improve decoding accuracy. In this way, a candidate sentence with high importance is emphasized, and the reconstruction error function can reach an extremum in a process of executing the unsupervised learning model. Therefore, the cascaded attention mechanism may be used to integrate attention information of each candidate sentence in different semantic dimensions in the preset network model in order to improve accuracy of importance estimation of each sentence. In this way, when a phrase that meets the preset condition is selected from the candidate sentence set based on the importance of each candidate sentence set as a summary phrase set, redundancy in the summary phrase set may be reduced, and a problem that redundancy information in a generated document summary is relatively large is avoided.

With reference to the first aspect, in a first possible implementation of the first aspect, the training each candidate sentence in the candidate sentence set using a cascaded attention mechanism and an unsupervised learning model in a preset network model, to obtain importance of each candidate sentence in the candidate sentence set includes obtaining, based on the preset network model, m vectors used to describe the event, and optimizing, based on each candidate sentence, the m vectors used to describe the event, and a candidate matrix, the reconstruction error function in a process of executing the unsupervised learning model, and using, as importance of one candidate sentence in a case of a minimum value of the reconstruction error function, a modulus of a row vector of each row in the cascaded attention mechanism matrix output by the preset network model, to obtain the importance of each candidate sentence, where the reconstruction error function includes a relationship between each candidate sentence and the m vectors used to describe the event, the candidate matrix, and a weight corresponding to the candidate matrix, the candidate matrix is an m×n matrix, m and n are positive integers, and n is a quantity of words included in the plurality of candidate documents. An objective of the reconstruction error function is to reconstruct each candidate sentence in the candidate sentence set using the m output vectors. An error is small. This indicates that the m vectors extracted from each candidate sentence in the candidate sentence set almost carry important information of the event, and a key extraction step is that the cascaded attention mechanism matrix is responsible for focusing on specific candidate sentences such that a modulus of a row vector of each row in the cascaded attention mechanism matrix may be used as importance of one candidate sentence.

With reference to the first aspect or the first possible implementation of the first aspect, in a second possible implementation of the first aspect, the selecting, based on the importance of each candidate sentence, a phrase that meets a preset condition from the candidate sentence set as a summary phrase set includes filtering out a word that does not meet a preset rule in each candidate sentence to obtain each candidate sentence obtained after the filtering, extracting at least one first part-of-speech phrase and at least one second part-of-speech phrase from a syntax tree of each candidate sentence obtained after the filtering, to constitute a phrase set, calculating, based on the importance of each candidate sentence, importance of the at least one first part-of-speech phrase and the at least one second part-of-speech phrase that are extracted from each candidate sentence, and selecting, from the phrase set based on the importance of the at least one first part-of-speech phrase and the at least one second part-of-speech phrase that correspond to each candidate sentence, a first part-of-speech phrase and a second part-of-speech phrase that meet the preset condition as the summary phrase set. A candidate sentence is filtered according to the preset rule, at least one first part-of-speech phrase and at least one second part-of-speech phrase are extracted based on importance of each candidate sentence from each candidate sentence obtained after the filtering, to constitute a phrase set, and a first part-of-speech phrase and a second part-of-speech phrase that meet the preset condition are selected from the phrase set as a summary phrase set. In this way, redundancy information can be further prevented from being introduced into the selected summary phrase set.

With reference to any one of the first aspect to the second possible implementation of the first aspect, in a third possible implementation of the first aspect, the filtering out a word that does not meet a preset rule in each candidate sentence to obtain each candidate sentence obtained after the filtering includes filtering out noise in each candidate sentence to obtain a candidate word set corresponding to each candidate sentence, where each candidate sentence includes a plurality of words, and each of the plurality of words corresponds to one importance, and filtering out, based on the importance of each word, a word whose importance is less than a preset threshold in the candidate word set corresponding to each candidate sentence, to obtain each candidate sentence obtained after the filtering. With reference to importance of a word, a word whose importance is less than the preset threshold in a candidate sentence is filtered, and a redundant word can be further prevented from being introduced into each candidate sentence.

With reference to any one of the first aspect to the third possible implementation of the first aspect, in a fourth possible implementation of the first aspect, before the filtering out, based on the importance of each word, a word whose importance is less than a preset threshold in the candidate word set corresponding to each candidate sentence, to obtain each candidate sentence obtained after the filtering, the method provided in this embodiment of the present disclosure further includes training each candidate sentence in the candidate sentence set using the cascaded attention mechanism and the unsupervised learning model in the preset network model, to obtain importance of each of a plurality of different words included in the plurality of candidate documents.

With reference to any one of the first aspect to the fourth possible implementation of the first aspect, in a fifth possible implementation of the first aspect, the training each candidate sentence in the candidate sentence set using the cascaded attention mechanism and the unsupervised learning model in the preset network model, to obtain importance of each of a plurality of different words included in the plurality of candidate documents includes optimizing, based on each candidate sentence, the m vectors used to describe the event, and the candidate matrix, the reconstruction error function in the process of executing the unsupervised learning model, and using a modulus of a column vector of each column in the candidate matrix as importance of one word in the case of the minimum value of the reconstruction error function, to obtain the importance of each word.

With reference to any one of the first aspect to the fifth possible implementation of the first aspect, in a sixth possible implementation of the first aspect, the calculating, based on the importance of each candidate sentence, importance of the at least one first part-of-speech phrase and the at least one second part-of-speech phrase that are extracted from each candidate sentence includes obtaining a word frequency of each of the at least one first part-of-speech phrase and the at least one second part-of-speech phrase, and calculating, based on the word frequency of each part-of-speech phrase and importance of a candidate sentence in which each part-of-speech phrase is located, the importance of the at least one first part-of-speech phrase and the at least one second part-of-speech phrase that are extracted from each candidate sentence.

With reference to any one of the first aspect to the sixth possible implementation of the first aspect, in a seventh possible implementation of the first aspect, the selecting, from the phrase set based on the importance of the at least one first part-of-speech phrase and the at least one second part-of-speech phrase that correspond to each candidate sentence, a first part-of-speech phrase and a second part-of-speech phrase that meet the preset condition as the summary phrase set includes inputting the importance of each of the at least one first part-of-speech phrase and the at least one second part-of-speech phrase and similarity between the part-of-speech phrases into an integer linear programming function, and determining a candidate weight of each part-of-speech phrase and a correlation weight of the similarity between the part-of-speech phrases when an extremum is taken for the integer linear programming function, and determining, based on the candidate weight of each part-of-speech phrase and the correlation weight of the similarity between the part-of-speech phrases, a part-of-speech phrase that meets the preset condition, where a candidate weight of a part-of-speech phrase is used to determine whether the part-of-speech phrase is a part-of-speech phrase that meets the preset condition, and the correlation weight is used to determine whether similar phrases are simultaneously selected.

According to a second aspect, an embodiment of the present disclosure provides a multi-document summary generation apparatus, including an obtaining unit configured to obtain a candidate sentence set, where the candidate sentence set includes candidate sentences included in each of a plurality of candidate documents about a same event, an estimation unit configured to train each candidate sentence in the candidate sentence set using a cascaded attention mechanism and an unsupervised learning model in a preset network model, to obtain importance of each candidate sentence, where importance of one candidate sentence corresponds to a modulus of one row vector in a cascaded attention mechanism matrix output in a process in which the preset network model optimizes a reconstruction error function using the unsupervised learning model, and the importance of the candidate sentence is used to indicate an importance degree of a meaning expressed by the candidate sentence in the plurality of candidate documents, a selection unit configured to select, based on the importance of each candidate sentence, a phrase that meets a preset condition from the candidate sentence set as a summary phrase set, and a generation unit configured to obtain a summary of the plurality of candidate documents based on the summary phrase set.

With reference to the second aspect, in a first possible implementation of the second aspect, the obtaining unit is further configured to optimize, based on each candidate sentence, the m vectors used to describe the event, and a candidate matrix, the reconstruction error function in a process of executing the unsupervised learning model, and use, as importance of one candidate sentence in a case of a minimum value of the reconstruction error function, a modulus of a row vector of each row in the cascaded attention mechanism matrix output by the preset network model, to obtain the importance of each candidate sentence, where the reconstruction error function includes a relationship between each candidate sentence and the m vectors used to describe the event, the candidate matrix, and a weight corresponding to the candidate matrix, the candidate matrix is an m×n matrix, m and n are positive integers, and n is a quantity of words included in the plurality of candidate documents.

With reference to the second aspect or the first possible implementation of the second aspect, in a second possible implementation of the second aspect, the apparatus provided in this embodiment of the present disclosure further includes a filtering unit configured to filter out a word that does not meet a preset rule in each candidate sentence to obtain each candidate sentence obtained after the filtering, and an extraction unit configured to extract at least one first part-of-speech phrase and at least one second part-of-speech phrase from a syntax tree of each candidate sentence obtained after the filtering, to constitute a phrase set, where the estimation unit is further configured to calculate, based on the importance of each candidate sentence, importance of the at least one first part-of-speech phrase and the at least one second part-of-speech phrase that are extracted from each candidate sentence, and the selection unit is further configured to select, from the phrase set based on the importance of the at least one first part-of-speech phrase and the at least one second part-of-speech phrase that correspond to each candidate sentence, a first part-of-speech phrase and a second part-of-speech phrase that meet the preset condition as the summary phrase set.

With reference to any one of the second aspect to the second possible implementation of the second aspect, in a third possible implementation of the second aspect, the filtering unit is further configured to filter out noise in each candidate sentence to obtain a candidate word set corresponding to each candidate sentence, where each candidate sentence includes a plurality of words, and each of the plurality of words corresponds to one importance, and filter out, based on the importance of each word, a word whose importance is less than a preset threshold in the candidate word set corresponding to each candidate sentence, to obtain each candidate sentence obtained after the filtering.

With reference to any one of the second aspect to the third possible implementation of the second aspect, in a fourth possible implementation of the second aspect, the estimation unit is further configured to train each candidate sentence in the candidate sentence set using the cascaded attention mechanism and the unsupervised learning model in the preset network model, to obtain importance of each of a plurality of different words included in the plurality of candidate documents.

With reference to any one of the second aspect to the fourth possible implementation of the second aspect, in a fifth possible implementation of the second aspect, the estimation unit is further configured to optimize, based on each candidate sentence, the m vectors used to describe the event, and the candidate matrix, the reconstruction error function in the process of executing the unsupervised learning model, and use a modulus of a column vector of each column in the candidate matrix as importance of one word in the case of the minimum value of the reconstruction error function, to obtain the importance of each word.

With reference to any one of the second aspect to the fifth possible implementation of the second aspect, in a sixth possible implementation of the second aspect, the obtaining unit is further configured to obtain a word frequency of each of the at least one first part-of-speech phrase and the at least one second part-of-speech phrase, and the estimation unit is further configured to calculate, based on the word frequency of each part-of-speech phrase and importance of a candidate sentence in which each part-of-speech phrase is located, the importance of the at least one first part-of-speech phrase and the at least one second part-of-speech phrase that are extracted from each candidate sentence.

With reference to any one of the second aspect to the sixth possible implementation of the second aspect, in a seventh possible implementation of the second aspect, the obtaining unit is further configured to input the importance of each of the at least one first part-of-speech phrase and the at least one second part-of-speech phrase and similarity between the part-of-speech phrases into an integer linear programming function, and determine a candidate weight of each part-of-speech phrase and a correlation weight of the similarity between the part-of-speech phrases when an extremum is taken for the integer linear programming function, and the selection unit is further configured to determine, based on the candidate weight of each part-of-speech phrase and the correlation weight of the similarity between the part-of-speech phrases, a part-of-speech phrase that meets the preset condition, where a candidate weight of a part-of-speech phrase is used to determine whether the part-of-speech phrase is a part-of-speech phrase that meets the preset condition, and the correlation weight is used to determine whether similar phrases are simultaneously selected.

According to a third aspect, an embodiment of the present disclosure provides a terminal, and the terminal includes a processor, a memory, a system bus, and a communications interface, where the memory is configured to store a computer executable instruction, the processor and the memory are connected using the system bus, and when the terminal runs, the processor executes the computer executable instruction stored in the memory such that the terminal performs the multi-document summary generation method described in any one of the first aspect to the seventh possible implementation of the first aspect.

According to a fourth aspect, an embodiment of the present disclosure provides a computer-readable storage medium, including an instruction, and when the instruction runs on a terminal, the terminal is enabled to perform the multi-document summary generation method described in any one of the first aspect to the seventh possible implementation of the first aspect.

DESCRIPTION OF EMBODIMENTS

Figure 1:
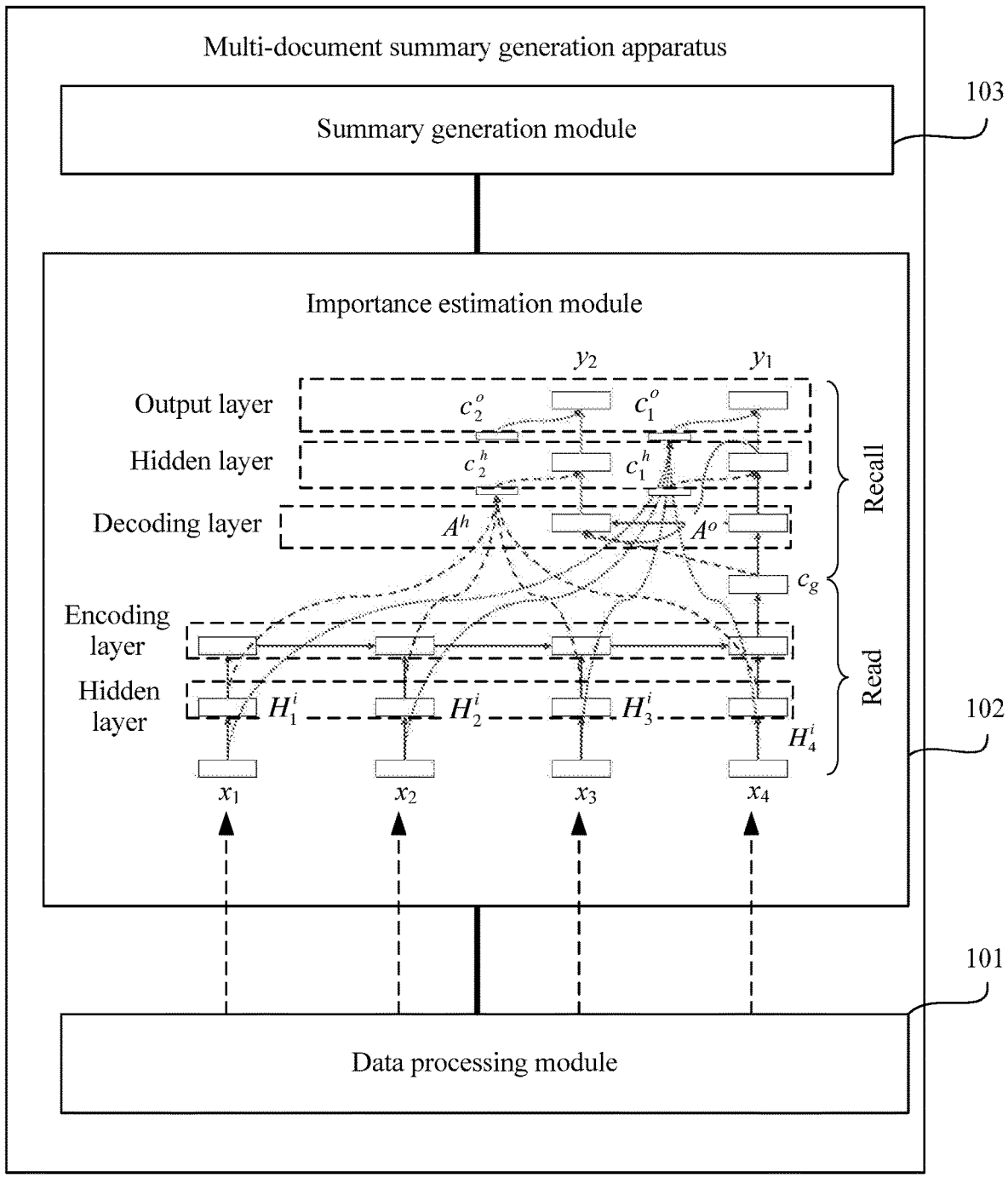
FIG. 1 is a schematic structural diagram 1 of a multi-document summary generation apparatus according to an embodiment of the present disclosure.

FIG. 1 is a schematic structural diagram of a multi-document summary generation apparatus according to an embodiment of the present disclosure. The apparatus includes a data processing module 101, an importance estimation module 102 connected to the data processing module 101, and a summary generation module 103 connected to the importance estimation module 102.

The data processing module 101 is configured to convert, into a candidate sentence, each of a plurality of candidate documents that are about a same event and for which summaries are to be generated in order to obtain a candidate sentence set D, then generate a dictionary with a size V for all words in the plurality of candidate documents about the same event, and finally represent each candidate sentence using a V-dimensional vector $x_j$ (j=1, ..., N, and N is a maximum quantity of candidate sentences in the candidate sentence set D), and input each candidate sentence represented using the V-dimensional vector into the importance estimation module 102, for example, candidate sentences $x_1$, $x_2$, $x_3$, and $x_4$ shown in FIG. 1. It may be understood that in an embodiment, candidate sentences input into the importance estimation module 102 are not limited to $x_1$, $x_2$, $x_3$, and $x_4$, and are even more than $x_1$, $x_2$, $x_3$, and $x_4$. $x_1$, $x_2$, $x_3$, and $x_4$ are only used as an example for description in this embodiment of the present disclosure.

The importance estimation module 102 is modeled using a cascaded attention mechanism and an unsupervised learning model. The importance estimation module 102 mainly performs iterative training on N candidate sentences that are input by the data processing module 101, performs convergence after a maximum of 300 iterations, and finally outputs importance of each candidate sentence and importance of each word. The importance of the candidate sentence is used to finally determine a summary phrase set, and the importance of the word is used to filter out redundancy information in each candidate sentence.

The importance estimation module 102 cites, based on a data reconstruction framework, the cascaded attention mechanism in a process of estimating importance of a candidate sentence. A hidden-layer vector and an output-layer vector of a preset network model belong to different vector space, and represent different semantic content. Therefore, different cascaded attention mechanism calculation methods are introduced in different semantic representations. In this way, a candidate sentence importance estimation method can be further improved. Because candidate sentences or phrases that have high importance are finally extracted to constitute a summary phrase set, and to subsequently generate a multi-document summary, redundancy in the finally generated multi-document summary is reduced, and the generated multi-document summary can more accurately cover main content expressed by an event.

The importance estimation module 102 provided in this embodiment of the present disclosure is modeled using the cascaded attention mechanism such that a decoding effect can be improved, and information about a cascaded attention mechanism matrix may be used to estimate importance of each candidate sentence. This application proposes the cascaded attention mechanism in order to integrate attention information of different semantic dimensions, and further improve accuracy of sentence importance degree estimation.

As shown in FIG. 1, the importance estimation module 102 includes two phases. One of the phases is a read phase and is also referred to as an encoding phase, and the other phase is a recall phase and is also referred to as a decoding phase.

I. Read Phase

All candidate sentences in the candidate sentence set D of a same event is initially a vector model that is based on a bag-of-words model, and has problems such as sparsity, inaccurate semantic description, and curse of dimensionality. Therefore, in the read process, each sentence may be first mapped to a hidden layer of a neural network to generate dense embedding vector representations, then all candidate sentences are mapped to a new status using an encoding model that is based on a Recurrent Neural Network (RNN) model and that is established at an Encoding layer (Enc layer), and a status at the last moment is used as a global variable $c_g$ of this event, where $c_g$ reflects all information about a plurality of candidate documents of the event. Then the decoding phase is entered.

A specific process of the encoding phase is as follows.

First, the importance estimation module 102 maps each candidate sentence to a hidden layer of the encoding phase using a formula ($H^i_j = \tan h(W^i_{xH} x_j + b^i_{xH})$) in the encoding phase, and represents each candidate sentence using dense embedding vectors.

Herein, i represents an input phase, j represents a number of a candidate sentence (j=1, ... N, and N is a maximum quantity of candidate sentences in the candidate sentence set D), W and b each are neural network parameters corresponding to the hidden layer, and H represents the hidden layer.

Second, the importance estimation module 102 may further encode, as one vector using the RNN model established at the encoding layer, all candidate sentences represented by dense embedding vectors. The vector becomes the global semantic vector $c_g$ reflecting a plurality of candidate documents. It may be learned from FIG. 1 that mapping logic of the RNN model is as follows:

$$H^e_t = f(H^e_{t-1}, H^i_t), \text{ where}$$

e represents the RNN model in the encoding phase, and $f(.)$ is a Long Short-Term Memory (LSTM) model, a Gated Recurrent Unit (GRU) model, or an RNN model. Herein, $H^e_t$ represents a status vector of each candidate sentence at a $t^{th}$ moment in the encoding phase, $H^i_t$ represents an embedding vector of each candidate sentence at a $t^{th}$ moment in the input phase, and $H_{t-1}^e$ represents a status vector of each candidate sentence at a $(t-1)^{th}$ moment in the encoding phase.

For example, it may be learned from the encoding layer shown in FIG. 1 that the candidate sentences $x_1$, $x_2$, $x_3$, and $x_4$ are mapped to obtain embedding vector representations $H_1^i$, $H_2^i$, $H_3^i$, and $H_4^i$ of all the candidate sentences using a formula ($H_j^i$=tan h($W_{xH}^i x_j + b_{xH}^i$)). Then the status vector of each candidate sentence at the $t^{th}$ moment in the encoding phase is calculated based on the embedding vector of each candidate sentence. Because when a next status of a target sequence of the cascaded attention mechanism is generated, a source sequence may be considered for finding a basis segment, a status vector $H_{t1}^e$ of a candidate sentence $x_1$ at the $t^{th}$ moment may be obtained by inputting $H_1^i$ into the model $f(.)$, and a status vector $H_{t2}^e$ of a candidate sentence $x_2$ at the $t^{th}$ moment may be obtained by inputting $H_{t1}^e$ and $H_2^i$ into the model $f(.)$. For a status vector of another candidate sentence, refer to the status vector $H_{t2}^e$ of the candidate sentence $x_2$ at the $t^{th}$ moment. Details are not described herein again in this embodiment of the present disclosure.

In this embodiment of the present disclosure, the RNN model is used as an example. In the RNN model, all sentences are mapped to a new status $\{h_t^e\}$, and a status at the last moment is used as the global variable $c_g$ of this event. As shown in FIG. 1, $c_g$ is obtained by inputting $H_4^i$ and a status vector $H_{t3}^e$ of a candidate sentence $x_3$ at a moment t into the model $f(.)$, and information about all the plurality of candidate documents about the event is reflected in $c^g$. Then the decoding phase is entered.

II. Decoding Phase

The decoding phase is mainly a process used to decode, at a decode layer (dec layer) as m vectors that can be used for describing information about m different aspects of the event, the global variable $c_g$ generated in the encoding phase. A decoding model that is based on the RNN model is established at the decoding layer.

Herein, m is far less than a quantity N of candidate sentences included in a plurality of candidate documents, and input N candidate sentences are reconstructed to a maximum extent using m condensed vectors. Therefore, the m output vectors need to include most important information, to obtain only the most important information through decoding such that original input can be reconstructed. The decoding model established at the decoding layer is also based on the RNN model:

$H_t^d = f(H_{t-1}^d, H_{t-1}^o, c_g)$, where d represents the decoding layer, o represents an output layer, and then a mapping is added:

$H_t^o = \tan h(W_{HH}^o H_t^d + b_H^o)$

Finally, the output layer re-maps a hidden-layer vector to a vector that is of a dictionary dimension value and that can represent information about an aspect of an event:

$y_t = \delta(W_{Hy} H_t^o + b_y)$.

For example, $y_t$ is $y_1$ or $y_2$ shown in FIG. 1.

In conclusion, it may be learned that the preset network model is established using a cascaded attention mechanism and an unsupervised learning model. First, a source vector (that is, N candidate sentences) is encoded using the RNN model at the encoding layer, the source vector is encoded as an intermediate vector $H_t^e = f(H_{t-1}^e, H_t^i)$ of a fixed dimension, and the intermediate vector is then decoded and translated into a target vector using the RNN model at the decoding layer, for example, $y_t = \sigma(W_{Hy} H_t^o + b_y)$.

The preset network model is established using the cascaded attention mechanism such that a decoding effect may be improved. In addition, a modulus of each row vector in a cascaded attention mechanism matrix may be used to estimate importance of a sentence. This application proposes the cascaded attention mechanism in order to integrate attention information of different semantic dimensions, and further improve accuracy of sentence importance degree estimation. First, in this application, the cascaded attention mechanism is introduced at a hidden layer in the decoding phase, and an attention calculation method is as follows:

$$a_{t,s}^H = \frac{\exp(\text{score}(H_t^o, H_s^i))}{\sum_{s'} \exp(\text{score}(H_t^o, H_{s'}^i))}.$$

Herein, the function score(.) is used to calculate an attention relationship between the target vector $H_t^o$ and the source vector $H_s^i$, and $H_s^i$ represents an $s^{th}$ candidate sentence of the input phase.

The hidden-layer vector of the decoding phase is then updated based on the cascaded attention mechanism matrix:

$$c_t^h = \sum_{s'} a_{t,s'}^h H_{s'}^i$$

$$h_t^o = \tanh(W_{cH}^a c_t^H + W_{HH}^a H_t^o).$$

The cascaded attention mechanism is not only introduced at the hidden layer in the decoding phase, but also is introduced at the output layer in the decoding phase in this application, and attention information at the hidden layer in the decoding phase is integrated. Details are as follows:

$$\bar{a}_{t,s}^o = \frac{\exp(\text{score}(y_t, x_s))}{\sum_{s'} \exp(\text{score}(y_t, x_{s'}))}$$

$$a_{t,s}^o = \lambda_a \bar{a}_{t,s}^o + (1 - \lambda_a) a_{t,s}^h$$

$$c_t^o = \sum_{s'} a_{t,s'}^o x_{s'}$$

$$y_t = \lambda_c c_t^o + (1 - \lambda_c) y_t,$$

where $\lambda_a$ is a weight of attention information. The model automatically learns the weight.

For the function score(.), the following three different calculation methods may be used in this application:

$$\text{score}(h_t, h_s) = \begin{cases} h_t^T h_s & \text{dot} \\ h_t^T W h_s & \text{tensor} \\ v^T \tanh(W[h_t; h_s]) & \text{concat.} \end{cases}$$

According to a comparison test result, a concat method is used at the hidden layer in the decoding phase, and a dot method is used at the output layer in the decoding phase, to further improve accuracy of candidate sentence importance estimation.

The cascaded attention mechanism is only a component and a part of a parameter of the preset network model. To solve each parameter in the preset network model after the attention mechanism is introduced, this application solves the parameter using the unsupervised learning model. Details are as follows.

A training target of the model is to reconstruct initial N sentence vectors X using vectors Y in terms of m topics. This is an unsupervised data reconstruction process, and a training target is to minimize a reconstruction error.

$$J = \min_{\Theta} \frac{1}{2N} \sum_{i=1}^{N} \left\| x_i - \sum_{j=1}^{m} y_j \right\|_2^2 + \lambda \|Y\|_{2,1}.$$

After the training is completed, a modulus of a vector corresponding to each sentence in the cascaded attention mechanism matrix at the output layer is used as a score of sentence importance. A modulus of a corresponding column vector of each column in a candidate matrix Y output from the output layer is used as a score of word importance. The candidate matrix Y is a matrix constructed using m vectors as row vectors and using n words as column vectors.

The summary generation module 103 is mainly configured to remove redundancy information from the plurality of candidate documents to obtain a summary phrase set, and combine the summary phrase set into summary sentences in a preset combination manner, to obtain and output a summary of the plurality of candidate documents.

There are two main processes for the summary generation module 103 to remove the redundancy information in the plurality of candidate documents. One of the processes is coarse-granularity sentence filtering, in an embodiment, relatively obvious noise in each candidate sentence is filtered according to an empirical rule. The other process is fine-granularity sentence filtering, in an embodiment, each candidate sentence obtained after coarse-granularity sentence compression is parsed to constitute a syntax tree of each candidate sentence using a syntax parser, a noun phrase and a verb phrase are extracted from the syntax tree of each candidate sentence, and importance of the noun phrase and the verb phrase included in each candidate sentence is calculated based on importance of each candidate sentence. Finally, when correct syntax is ensured, phrases are selected using an Integer Linear Programming (ILP) model such that phrases whose importance does not meet a preset requirement are deleted from the syntax tree of each candidate sentence, and phrases whose importance meets the requirement are retained. In this process, the ILP model does not select a phrase whose importance does not meet the requirement and input the phrase into a summary, thereby further filtering redundancy in each candidate sentence at a fine granularity level.

It may be understood that, in an embodiment, the multi-document summary generation apparatus shown in FIG. 1 may include more components than those shown in FIG. 1. This is not limited in this embodiment of the present disclosure.

Figure 2:
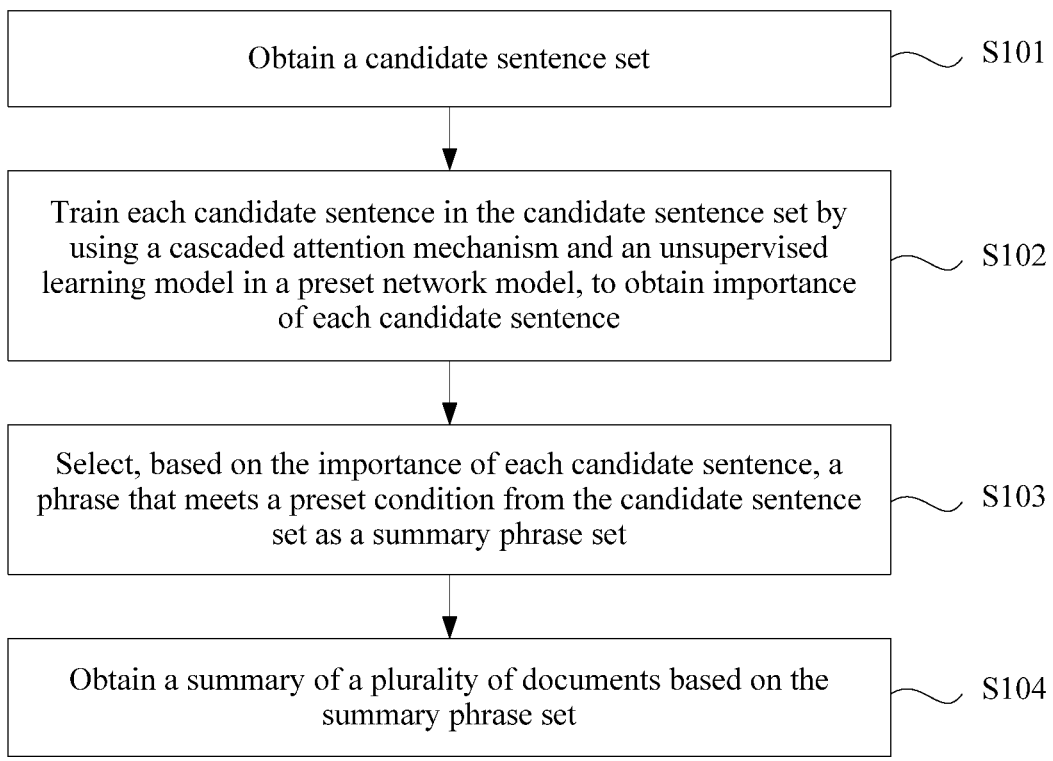
FIG. 2 is a schematic flowchart 1 of a multi-document summary generation method according to an embodiment of the present disclosure.

As shown in FIG. 2, an embodiment of the present disclosure provides a multi-document summary generation method. The method is performed by the multi-document summary generation apparatus shown in FIG. 1. The method includes the following steps.

S101. The multi-document summary generation apparatus obtains a candidate sentence set, where the candidate sentence set includes candidate sentences included in each of a plurality of candidate documents about a same event.

The plurality of candidate documents in this embodiment of the present disclosure are about the same event, and the event is not limited in this embodiment of the present disclosure. In an embodiment, all the plurality of candidate documents about the same event may be used as basic documents for extracting summaries of the plurality of candidate document in this application. The plurality of candidate documents may be news reports about a same event, or may be other articles about a same event. This is not limited in this embodiment of the present disclosure.

For example, in this embodiment of the present disclosure, that the plurality of candidate documents are news reports about a same event is used as an example. For example, the event may be news reports of "so-and-so earthquake".

In an embodiment, a quantity of the plurality of candidate documents in an embodiment may be set as required. This is not limited in this embodiment of the present disclosure.

For example, the quantity of the plurality of candidate documents is 10 to 20.

It may be understood that each candidate sentence included in the candidate sentence set in this embodiment of the present disclosure is represented in a form of a vector.

For example, each candidate sentence may be represented using an n-dimensional vector, where n is a quantity of words included in a plurality of candidate documents.

It should be noted that, in an embodiment, because the plurality of candidate documents are about a same event, certainly, the plurality of candidate documents may include a same word, or same words exist in a same candidate document. Therefore, when calculating a quantity of words included in a plurality of candidate documents, a quantity of same words needs to be denoted as 1. For example, the word "so-and-so earthquake" appears 10 times in the plurality of candidate documents, a sum of a quantity of remaining words (that are different from each other) is 50, and a quantity of words included in the plurality of candidate documents is 51.

S102. The multi-document summary generation apparatus trains each candidate sentence in the candidate sentence set using a cascaded attention mechanism and an unsupervised learning model in a preset network model, to obtain importance of each candidate sentence, where importance of one candidate sentence corresponds to a modulus of one row vector in a cascaded attention mechanism matrix, the cascaded attention mechanism matrix is output in a process in which the preset network model optimizes a reconstruction error function using the unsupervised learning model, and the importance of the candidate sentence is used to indicate an importance degree of a meaning expressed by the candidate sentence in the plurality of candidate documents.

In an embodiment, in an embodiment, all candidate sentences (represented in a vector form) included in the candidate sentence set may be input into the importance estimation module shown in FIG. 1 to perform iterative training, and convergence is performed after a maximum of 300 iterations. In output of the importance estimation module, a modulus of a row vector of each row in the cascaded attention mechanism matrix is used as importance of one candidate sentence.

S103. The multi-document summary generation apparatus selects, based on the importance of each candidate sentence, a phrase that meets a preset condition from the candidate sentence set as a summary phrase set.

S104. The multi-document summary generation apparatus obtains a summary of the plurality of candidate documents based on the summary phrase set.

This embodiment of the present disclosure provides a multi-document summary generation method. The cascaded attention mechanism and the unsupervised learning model in the preset network model are used to train each candidate sentence in the candidate sentence set to obtain the importance of each candidate sentence in the candidate sentence set. When a next status of a target sequence of the cascaded attention mechanism is generated, a source sequence may be considered for finding a basis segment, to improve decoding accuracy. In this way, a candidate sentence with high importance is emphasized, and the reconstruction error function can reach an extremum in a process of executing the unsupervised learning model. Therefore, the cascaded attention mechanism may be used to integrate attention information of each candidate sentence in different semantic dimensions in the preset network model in order to improve accuracy of importance estimation of each sentence. In this way, when a phrase that meets the preset condition is selected from the candidate sentence set based on the importance of each candidate sentence set as a summary phrase set, redundancy in the summary phrase set may be reduced, and a problem that redundancy information in a generated document summary is relatively large is avoided.

Figure 3:
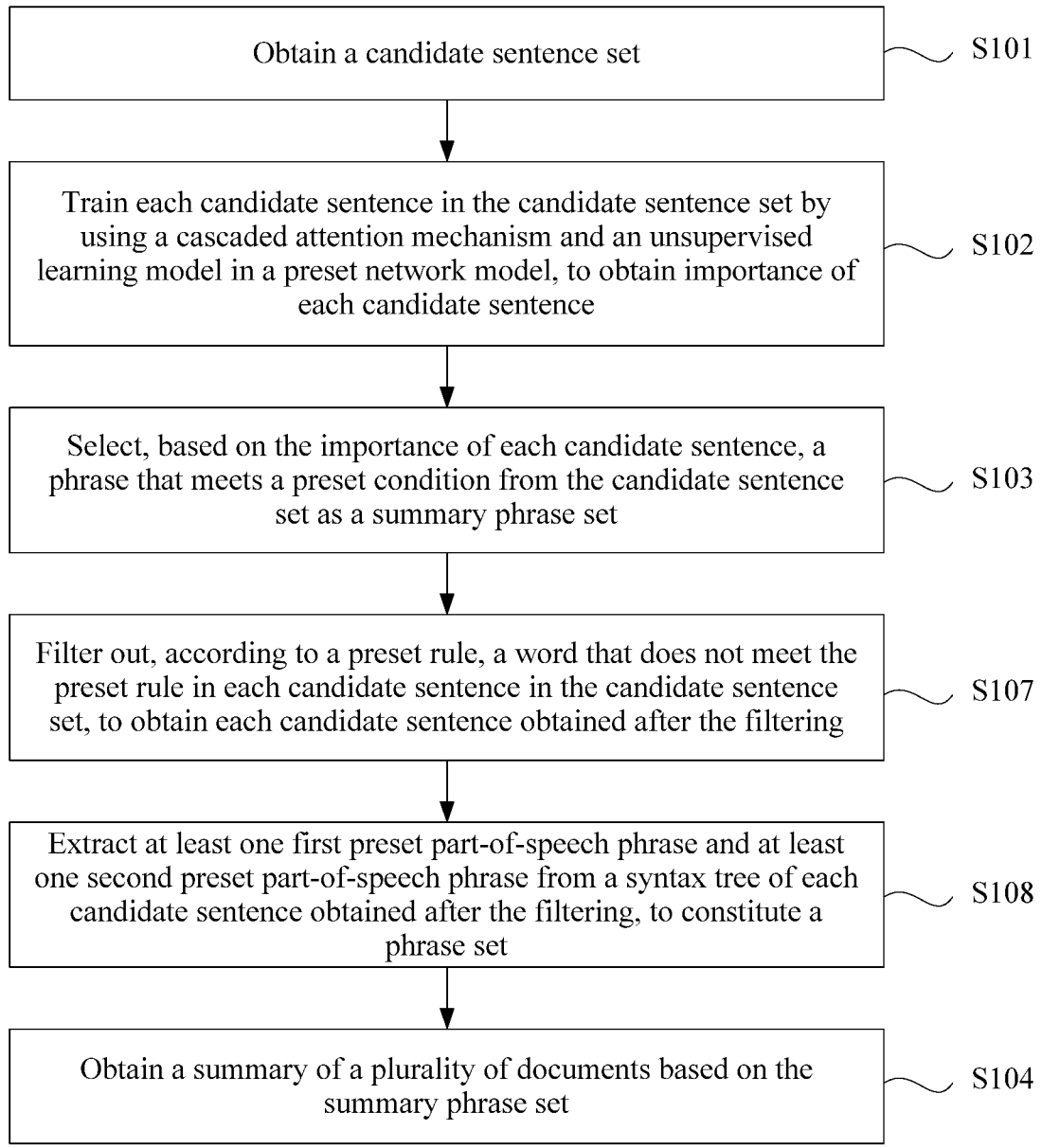
FIG. 3 is a schematic flowchart 2 of a multi-document summary generation method according to an embodiment of the present disclosure.

Optionally, as shown in FIG. 3, step S102 provided in this embodiment of the present disclosure may be further implemented using steps S105 and S106 shown in FIG. 3.

S105. The multi-document summary generation apparatus obtains, based on the preset network model, m vectors used to describe an event.

S106. The multi-document summary generation apparatus optimizes, based on each candidate sentence, the m vectors used to describe the event, and a candidate matrix, the reconstruction error function in a process of executing the unsupervised learning model, and uses, as importance of one candidate sentence in a case of a minimum value of the reconstruction error function, a modulus of a row vector of each row in the cascaded attention mechanism matrix output by the preset network model, to obtain the importance of each candidate sentence, where the reconstruction error function includes a relationship between each candidate sentence and the m vectors used to describe the event, the candidate matrix, and a weight corresponding to the candidate matrix, the candidate matrix is an m×n matrix, m and n are positive integers, and n is a quantity of words included in the plurality of candidate documents.

Optionally, the reconstruction error function is $$J = \min_{\Theta} \frac{1}{2N} \sum_{i=1}^{N} \left\| x_i - \sum_{j=1}^{m} y_j \right\|_2^2 + \lambda \|Y\|_{2,1}.$$

When initial N sentence vectors $x_i$ are reconstructed using m vectors, target J is trained in the process of executing the unsupervised learning model, and in the case of the minimum value of the reconstruction error function, a modulus of a row vector of each row in the cascaded attention mechanism matrix output by the preset network model is used as importance of one candidate sentence.

To further improve precision of the selected summary phrase set, in this embodiment of the present disclosure, in step S103, a candidate sentence in the candidate sentence set is preliminarily filtered according to a preset rule, and a phrase that meets the preset condition is selected as the summary phrase set based on the importance of each candidate sentence on the basis of the candidate sentence obtained after the preliminary filtering. With reference to FIG. 2, step S103 in this embodiment of the present disclosure may be implemented using step S107 shown in FIG. 3 to S110.

S107. The multi-document summary generation apparatus filters out a word that does not meet the preset rule in each candidate sentence, to obtain each candidate sentence obtained after the filtering.

It may be understood that, when step S108 is performed, the multi-document summary generation apparatus provided in this embodiment of the present disclosure is further configured to parse, using a syntax parser to constitute a corresponding syntax tree, each candidate sentence obtained after the filtering. In step S107, the syntax parser may construct a syntax tree of each candidate sentence through semantic analysis of each candidate sentence in the plurality of candidate documents in order to segment each candidate sentence into a plurality of phrases, and each phrase obtained through segmentation is referred to as a branch of the syntax tree.

The syntax parser in this embodiment of the present disclosure may be an internal device of the multi-document summary generation apparatus. In an embodiment, the multi-document summary generation apparatus includes a syntax parser. Certainly, the syntax parser may be an external device of the multi-document summary generation apparatus. For example, the multi-document summary generation apparatus may further obtain a syntax tree of each candidate sentence using a syntax parser requested by a network. This is not limited in this embodiment of the present disclosure.

After the syntax parser parses each candidate sentence obtained after the filtering, to constitute a syntax tree, the multi-document summary generation apparatus may obtain a phrase set of each candidate sentence based on all phrases included in the syntax tree of each candidate sentence, where the phrase set of each candidate sentence includes phrases with a part of speech of a noun, a verb, a numeral, an adjective, and the like. Further, a phrase of a specific part of speech needs to be determined with reference to a phrase included in each candidate sentence. This is not limited in this embodiment of the present disclosure.

After the phrase set of each candidate sentence is obtained, the multi-document summary generation apparatus may obtain at least one first part-of-speech phrase and at least one second part-of-speech phrase from the phrase set of each candidate sentence.

It should be noted that, in an embodiment, each candidate sentence may be alternatively parsed to constitute a syntax tree using another parsing tool in order to obtain the phrase set of each candidate sentence.

Optionally, the preset rule in this embodiment of the present disclosure may be set based on experience or an actual requirement. This is not limited in this embodiment of the present disclosure.

It may be understood that, that the multi-document summary generation apparatus filters out a word that does not meet the preset rule in each candidate sentence in the candidate sentence set using the preset rule means filtering out obvious noise in each candidate sentence, for example, "so-and-so newspaper reports that . . . ", "so-and-so television broadcast station reports that . . . ", " . . . he says that . . . ".

Figure 4:
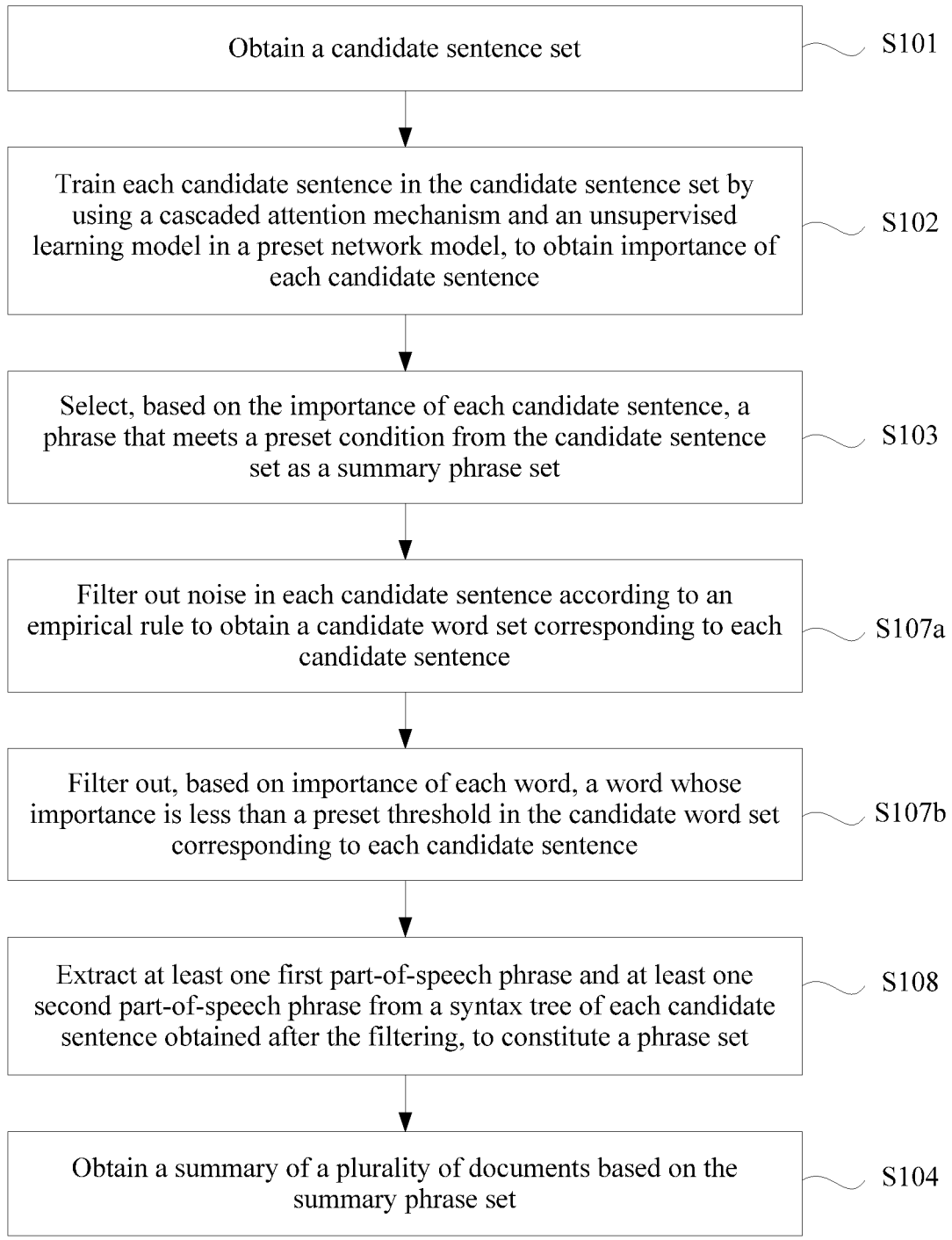
FIG. 4 is a schematic flowchart 3 of a multi-document summary generation method according to an embodiment of the present disclosure.

Optionally, with reference to FIG. 2 and FIG. 3, as shown in FIG. 4, step S107 in this embodiment of the present disclosure may be further implemented using step S107a and step S107b.

S107a. The multi-document summary generation apparatus filters out noise in each candidate sentence to obtain a candidate word set corresponding to each candidate sentence, where each candidate sentence includes a plurality of words, and each of the plurality of words corresponds to one importance.

It may be understood that the multi-document summary generation apparatus in this embodiment of the present disclosure filters out the noise in each candidate sentence according to an empirical rule.

S107b. The multi-document summary generation apparatus filters out, based on the importance of each word, a word whose importance is less than a preset threshold in the candidate word set corresponding to each candidate sentence, to obtain each candidate sentence obtained after the filtering.

The preset threshold is not limited in this embodiment of the present disclosure, and may be set as required in an embodiment. However, to avoid, as much as possible, introducing noise into a summary phrase set that finally forms a summary, a preset threshold may be set to a relatively large value during setting.

S108. The multi-document summary generation apparatus extracts at least one first part-of-speech phrase and at least one second part-of-speech phrase from a syntax tree of each candidate sentence obtained after the filtering, to constitute a phrase set.

Figure 5:
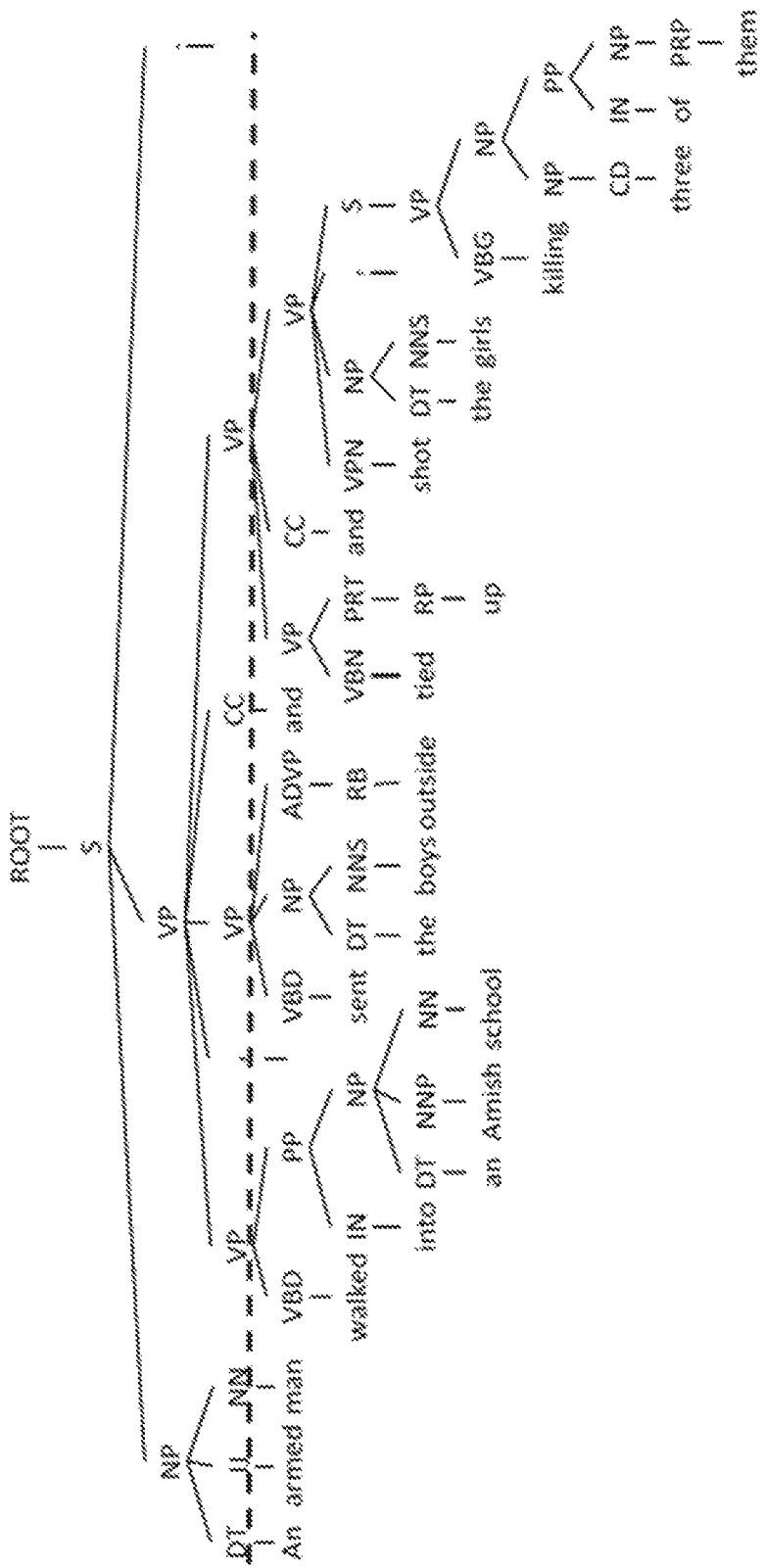
FIG. 5 is a schematic flowchart 4 of a multi-document summary generation method according to an embodiment of the present disclosure.

For example, FIG. 5 shows a syntax tree structure of a candidate sentence. It may be learned from FIG. 5 that a syntax tree obtained by parsing a candidate sentence includes Noun phrase (NP) and verb phrase (VP). As shown in FIG. 5, an NP is "An armed man", and a VP is "walked into an Amish school".

It may be understood that a noun phrase includes an article, an adjective (JJ), and a noun (NN), for example, an indefinite article, in an embodiment, "An" shown in FIG. 5, and the noun is "man" shown in FIG. 5.

As shown in FIG. 5, a VP and a VP in a syntax tree of a candidate sentence may also be connected by a connective (CC), for example, the connective is "and" in FIG. 5.

For a VP, a specific type of the verb phrase is not detailed herein in this embodiment of the present disclosure. The verb phrase may be formed by a verb and a preposition (PP), or the verb phrase may be formed by a verb and a noun phrase, for example, "walked into an Amish school" in FIG. 5. Plural nouns (NNS) is represented in FIG. 5.

In an embodiment, as shown in FIG. 5, after a candidate sentence is parsed to constitute a syntax tree, obtained verb phrases further include "sent the boys outside", "tied up and shot the girls", and "killing three of them".

S109. The multi-document summary generation apparatus calculates, based on the importance of each candidate sentence, importance of the at least one first part-of-speech phrase and the at least one second part-of-speech phrase that are extracted from each candidate sentence, where the at least one first part-of-speech phrase and the at least one second part-of-speech phrase belong to the phrase set.

Optionally, step S109 may be further implemented using step S109a and step S109b.

S109a. The multi-document summary generation apparatus obtains a word frequency of each of the at least one first part-of-speech phrase and the at least one second part-of-speech phrase in the plurality of candidate documents.

In this embodiment of the present disclosure, "word frequency" means a sum of frequency of a word appearing in each candidate document included in the plurality of candidate documents.

S109b. The multi-document summary generation apparatus calculates, based on the word frequency of each part-of-speech phrase and importance of a candidate sentence in which each part-of-speech phrase is located, the importance of the at least one first part-of-speech phrase and the at least one second part-of-speech phrase that are extracted from each candidate sentence.

When calculating importance of a phrase, the phrase inherits importance of a candidate sentence in which the phrase is located, namely, an attention Attention value of the candidate sentence. Importance of each part-of-speech may be determined using the following formula $$S_i = \left\{ \sum_{t \in P_i} tf(t) / \sum_{t \in Topic} tf(t) \right\} \times a_i.$$

Herein, i represents a number of the phrase, $S_i$ represents the importance of the phrase numbered i, $a_i$ represents the importance of the candidate sentence in which the phrase numbered i is located, t $f(t)$ represents a word frequency, Topic represents all words in the plurality of candidate documents about the same event, and $P_i$ represents the phrase numbered i.

Importance of a candidate sentence is used to measure an importance degree reflected, by information or content represented by the candidate sentence, in semantic content of a candidate document in which the candidate sentence is located.

Importance of a phrase is used to measure an importance degree reflected, by a concept or information represented by the phrase, in semantic content of a document represented by the phrase.

Optionally, in this embodiment of the present disclosure, the first part-of-speech phrase may be a phrase with a part of speech of a noun (simply referred to as a noun phrase), and the second part-of-speech phrase may be a phrase with a part of speech of a verb (simply referred to as a verb phrase).

Certainly, in this application, a phrase with another part of speech may be further included, such as an adjective phrase or a numeral phrase. This is further determined based on a phrase included in a plurality of candidate documents, and is not limited herein. It may be understood that, in natural language processing, a noun phrase actually includes a pronoun, and a pronoun is considered as a type of noun.

NP selection where a subject of each candidate sentence includes a noun phrase, and such a noun phrase is selected as a candidate subject for generating a new sentence. For example, as shown in FIG. 5, "An armed man" may be selected as a noun phrase in FIG. 5.

VP selection where a verb-object structure of a sentence includes a verb phrase, and such a verb phrase is selected as a candidate verb-object structure for generating a new sentence. For example, as shown in FIG. 5, in FIG. 5, "walked into an Amish school, sent the boys outside and tied up and shot the girls, killing three of them", "walked into an Amish school", "sent boys outside", and "tied up and shot the girls, killing three of them" are selected.

S110. The multi-document summary generation apparatus selects, from the phrase set based on the importance of the at least one first part-of-speech phrase and the at least one second part-of-speech phrase that correspond to each candidate sentence, a first part-of-speech phrase and a second part-of-speech phrase that meet the preset condition as the summary phrase set.

Optionally, step S110 may be further implemented in the following manners.

S110a. The multi-document summary generation apparatus inputs the importance of each of the at least one first part-of-speech phrase and the at least one second part-of-speech phrase and similarity between the part-of-speech phrases into an integer linear programming function, and determines a candidate weight of each part-of-speech phrase and a correlation weight of the similarity between the part-of-speech phrases when an extremum is taken for the integer linear programming function, where a candidate weight of a part-of-speech phrase is used to determine whether the part-of-speech phrase is a part-of-speech phrase that meets the preset condition.

S110b. The multi-document summary generation apparatus determines, based on the candidate weight of each part-of-speech phrase and the correlation weight of the similarity between the part-of-speech phrases, a part-of-speech phrase that meets the preset condition.

It may be understood that the preset condition includes a constraint on similarity between phrase features and phrases in a phrase set, and phrases that do not meet the preset condition are removed until the first part-of-speech phrase and the second part-of-speech phrase that meet the preset condition are retained as the summary phrase set. That a candidate weight of a part-of-speech phrase is 1 indicates that the part-of-speech phrase is a part-of-speech phrase that meets the preset condition when an extremum is taken for the integer linear programming function. That a candidate weight of a part-of-speech phrase is 0 indicates that the part-of-speech phrase is a part-of-speech phrase that does not meet the preset condition when an extremum is taken for the integer linear programming function.

Similarity between two phrases is used to indicate redundancy of the phrases in the plurality of candidate documents. The preset condition may be used to screen importance and the redundancy of the phrases using the constraint on the similarity between the features and the phrases.

Optionally, step S110 may be further implemented in the following manner.

The at least one first part-of-speech phrase, the at least one second part-of-speech phrase, and respective importance parameter values are input into the integer linear programming function $\max\{\Sigma_i \alpha_i S_i - \Sigma_{i<j} \alpha_{ij}(S_i+S_j)R_{ij}\}$ in order to optimize the integer linear programming function, and avoid, as much as possible, selecting similar phrases and inputting the phrases into a summary when a maximum value of the target function is ensured. By resolving the optimization problem, at least one first part-of-speech phrase and at least one second part-of-speech phrase that meet the condition are retained to constitute a summary phrase set to generate a final multi-document summary.

Herein, $P_i$ represents a phrase numbered i, $P_j$ represents a phrase numbered j, $S_i$ represents an importance parameter value of the phrase $P_i$, $S_j$ represents an importance parameter value of the phrase $P_j$, $R_{ij}$ represents similarity between the phrase $P_i$ and the phrase $P_j$, $\alpha_{ij}$ represents a weight of the similarity between the phrase $P_i$ and the phrase $P_j$, and $\alpha_i$ represents a weight of the phrase numbered i. A candidate weight of a part-of-speech phrase is used to determine whether the part-of-speech phrase is a part-of-speech phrase that meets the preset condition, and the correlation weight is used to determine whether similar phrases are simultaneously selected.

Similarity between phrases is used to measure a degree of semantic similarity between the phrases.

It may be understood that the foregoing is only an example of the integer linear programming function, and in an embodiment, an integer linear programming function in other forms may be further used to obtain weights or correlation weights of part-of-speech phrases.

Calculating the similarity between the two phrases may be calculating similarity between two verb phrases and similarity between two noun phrases, and may be implemented using cosine similarity or an index function (jaccard index).

Target function definition maximizing a sum of importance degrees of selected phrases and also minimizing redundancy in the selected phrases, where a part of the sum of importance degrees is a sum of weights of selected noun and verb phrases, and if redundancy exists in simultaneously selected noun phrase pairs or verb phrase pairs, performing a target function form penalty.

Optionally, before step S107, the method provided in this embodiment of the present disclosure further includes the following step.

S111. The multi-document summary generation apparatus optimizes, based on each candidate sentence, the m vectors used to describe the event, and the candidate matrix, the reconstruction error function in the process of executing the unsupervised learning model, and uses a modulus of a column vector of each column in the candidate matrix as importance of one word in the case of the minimum value of the reconstruction error function, to obtain the importance of each word.

Optionally, step S111 may be further implemented in the following manner:

According to the formula $$J = \min_{\Theta} \frac{1}{2N} \sum_{i=1}^{N} \left\| x_i - \sum_{j=1}^{m} y_j \right\|_2^2 + \lambda \|Y\|_{2,1},$$

the candidate matrix Y is used to make output vectors y as sparse as possible.

Optionally, step S104 in this embodiment of the present disclosure may be implemented in the following manner.

The summary phrase set is combined in a preset combination manner to obtain a summary of the plurality of candidate documents.

It should be noted that the preset combination manner in this embodiment of the present disclosure may be an existing combination manner, or may be another combination manner. This is not limited in this embodiment of the present disclosure.

For example, step S104 may be further implemented using steps S112 and S113.

S112. The multi-document summary generation apparatus arranges, based on a ranking of each part-of-speech phrase that is in the summary phrase set and that is in each candidate sentence of the plurality of candidate documents, a plurality of part-of-speech phrases included in the summary phrase set to obtain a summary sentence.

S113. The multi-document summary generation apparatus arranges the summary sentence in descending order of time when phrases with a part of speech of a verb appear in the plurality of candidate documents, to obtain a summary of the plurality of candidate documents.

Optionally, before step S113, the method further includes the following step.

S114. For a summary sentence that includes a plurality of phrases with a part of speech of a verb, the multi-document summary generation apparatus adds a conjunction between the plurality of verb phrases of the summary sentence.

A multi-document summary has a standard English verification data set, such as a Document Understanding Conference (DUC) 2007 data set and a Text Analysis Conference (TAC) 2011 data set. The following describes an effect of applying the multi-document summary generation method provided in this embodiment of the present disclosure to the DUC 2007 data set and the TAC 2011 data set to determine an extracted multi-document summary.

This technology first performs an effect verification test on DUC 2007 and TAC 2011. DUC 2007 has 45 topics with 20 news articles for each topic, four manual labeling summaries, and a summary character quantity that is limited to 250. TAC 2011 has 44 topics with 10 news articles for each topic, four manual labeling summaries, and a summary character quantity that is limited to 100. An evaluation indicator is F-measure of recall-oriented understudy for gisting evaluation (ROUGE). Evaluation results for evaluating precision of the multi-document summary extracted in this embodiment of the present disclosure are shown in Table 1 and Table 2. Table 1 shows a summary result of applying the method provided in this embodiment of the present disclosure to the DUC 2007 data set, and Table 2 shows a summary result of applying the method provided in this embodiment of the present disclosure to the TAC 2011 data set.

TABLE 1

Summary results generated using the method provided in this embodiment of the present disclosure in the DUC 2007 data set

| System | R-1 | R-2 | R-3 |
| --- | --- | --- | --- |
| Random | 0.302 | 0.046 | 0.088 |
| Lead | 0.312 | 0.058 | 0.102 |
| MDS-Sparse | 0.353 | 0.055 | 0.112 |
| DSDR | 0.398 | 0.087 | 0.137 |
| RA-MDS | 0.406 | 0.095 | 0.148 |
| The method | 0.423* | 0.107* | 0.161* |

TABLE 2

Summary results generated using the method provided in this embodiment of the present disclosure in TAC 2011

| System | R-1 | R-2 | R-3 |
| --- | --- | --- | --- |
| Random | 0.303 | 0.045 | 0.090 |
| Lead | 0.315 | 0.071 | 0.103 |
| PKUTM | 0.396 | 0.113 | 0.148 |
| ABS-Phrase | 0.393 | 0.117 | 0.148 |
| RA-MDS | 0.400 | 0.117 | 0.151 |
| The method | 0.400* | 0.121* | 0.153* |

Table 1 and Table 2 show a comparison between the summary results generated using this technology in the DUC 2007 data set and the TAC 2011 data set, and a comparison with other best unsupervised multi-document summary models. As a result, in the multi-document summary generation method provided in this application, best results are achieved in terms of all indicators, and an effect of the multi-document summary is improved.

The DUC 2007 data set has 45 topics with 20 news articles for each topic, four manual labeling summaries, and a summary character quantity that is limited to 250. TAC 2011 has 44 topics with 10 news articles for each topic, four manual labeling summaries, and a summary character quantity that is limited to 100. An evaluation indicator is F-measure of ROUGE.

As described above, according to the multi-document summary generation method provided in this application, importance of a word included in a plurality of candidate documents can be estimated. To verify an effect of the estimated importance of the word, four topics are selected from the TAC 2011 data set "Finland Shooting", "Heart Disease", "HIV Infection Africa" and "Pet Food Recall". For each topic, top 10 words corresponding to large dictionary dimension values are selected from an output vector, as shown in the following Table 3.

TABLE 3

Importance of words estimated using the method provided in this application in the four topics of the TAC 2011 data set

| Topic | Top 10 words of high importance |
| --- | --- |
| "Finland Shooting" | School, shooting, Auvinen, Finland, police, video, Wednesday, gunman, post |
| "Heart Disease" | Heart, disease, study, risk, test, blood, red, telomere, lavel |
| "Hiv Infection Africa" | HIV, Africa, circumcision, study, infection, trial, woman, drug, health |
| "Pet Food Recall" | Food, company, pet, recall, cat, dog, menu, product, make |

It may be learned from Table 3 that the top 10 words of each topic can accurately reflect main content of each topic. Therefore, it may be learned that the method provided in this embodiment of the present disclosure has a better effect of preliminarily estimating word importance.

In this experimental design, in this application, several typical topics are selected from the TAC 2011 data set (for example, a topic "VTech Shooting" and a topic "Oil Spill South Korea". Specific content of articles related to each topic may be obtained from the TAC 2011 data set. Details are not described in this embodiment of the present disclosure). For the selected typical topics, a multi-document summary generated using the method provided in this embodiment of the present disclosure and a multi-document summary generated through manual labeling are compared. This is shown in Table 4 and Table 5.

TABLE 4

Topic "VTech Shooting"

| ROUGE | ROUGE-1: 0.404; ROUGE-2: 0.119; and ROUGE-SU4: 0.153 |
| --- | --- |
| Multi-document summary generated using the method provided in this application | U.S. President George W. Bush said at the memorial service held at Virginia Tech Tuesday that the shooting rampage marked "a day of sadness" for the entire nation<br>A gunman opened fire in a dorm and classroom at Virginia Tech on Monday, killing at least 30 people in the deadliest shooting rampage in U.S. history<br>Virginia Tech, an unassuming university on the edge of the Appalachian hills, saw its calm shattered Monday when a gunman unloaded a barrage of bullets into a campus dormitory |

TABLE 4-continued

| Topic "VTech Shooting" | |
|---|---|
| Multi-document summary generated through manual labeling | and classrooms, killing 32 people<br>Virginia Tech known as the Virginia Polytechnic Institute and State University<br>Expert 1:<br>32 people, including the gunman, were killed and at least others 15 injured in two shooting attacks on Monday, April 15, 2007 at Virginia Tech in Blacksburg, VA.<br>It was the deadliest school shooting in American history.<br>It was not considered an act of terrorism.<br>The first attack was early in the morning when two people were killed in a dormitory.<br>Two hours later, the gunman killed the others in classrooms.<br>Immediately, questions were raised about whether the university had responded adequately to the shootings.<br>The gunman's name and motive have not been identified.<br>President Bush attended the memorial service.<br>Expert 2:<br>On Apr. 16, 2007 a gunman killed 32 people and wounded 29 others at Virginia Tech before killing himself.<br>This is the bloodiest school shooting in US history.<br>The gunman opened fire early Monday morning on a Virginia Tech dormitory, killing a man and a woman.<br>Two hours later the gunman opened fire on classrooms, killing 30 people.<br>Questions were raised regarding the University failure to issue a campus wide alert until the second incident.<br>University officials defended the decision, stating they were not expecting the second incident.<br>Virginia Tech classes were cancelled for the rest of the week.<br>Expert 3:<br>In the deadliest shooting in American history 32 people were killed and 29 wounded in two shooting attacks by a within three hours, early in the morning, at Virginia Tech University located in Blacksburg Virginia on Monday, April 16, 2007.<br>The shooter opened fire first in a dormitory then in a classroom in Norris hall.<br>Finally the shooter took his own life.<br>The campus was closed down and everyone was advised to stay indoors away from windows.<br>Police are investigating the identity and motive of the shooter.<br>The FBI said there was no sign the shootings were terrorist related.<br>Expert 4:<br>On Monday, April 16 at Virginia Tech in Blacksburg, a gunman killed a man and woman in West Ambler Johnston dormitory.<br>Police were called at 7:15am.<br>Shortly after 9:30am the gunman opened fire in Norris Hall, killing 30.<br>At least 15 were injured, some from jumping from upper story windows.<br>The gunman then killed himself.<br>After the 2nd incident began officials e-mailed a campus-wide alert.<br>Classes were canceled for the rest of the week.<br>University police and Virginia state police are investigating, with FBI assistance.<br>Terrorism is not indicated.<br>The shootings were nearly 8 years to the day after Columbine. |

TABLE 5

| Topic "Oil Spill South Korea" | |
|---|---|
| ROUGE Multi-document summary generated using the method provided in this application | ROUGE-1: 0.480; ROUGE-2: 0.223; and ROUGE-SU4: 0.248<br>About 10.5 million liters of crude oil leaked to waters off the western coast of South Korea on Friday after an oil tanker and a barge collided early on the day and became the largest offshore oil spill in South Korea<br>A Hong Kong-registered oil tanker leaked 10,810 tons, or 66,000 barrels, of crude oil off South Korea's stormy west coast on Friday |

TABLE 5-continued

Topic "Oil Spill South Korea"

| | |
|---|---|
| Multi-document summary generated through manual labeling | South Korea's Coast Guard dispatched dozens of ships Friday to prevent crude oil that leaked from a supertanker from reaching an ecologically sensitive shoreline on the country's west coast<br>Expert 1:<br>A Hong Kong registered oil tanker leaked 10,810 tons, or 66,000 barrels of crude oil off South Korea west coast on Friday, December 12, 2007, in what is estimated to be the nations largest maritime oil spill.<br>The spill occurred when a barge carrying a crane crashed into the tanker.<br>The government sent 57 vessels and 4 helicopters to try to contain the oil spill.<br>There were no human casualties.<br>Oil had reached South Korea Western coast by Saturday but no estimate of damage to the environmentally sensitive area was known yet.<br>Expert 2:<br>A crane-carrying vessel slammed into an oil-tanker off South Korea's west coast Friday, causing the tanker to leak about 66,000 barrels of crude oil, officials said.<br>It was the largest spill in Korean waters.<br>There were no human casualties.<br>The leakage was stopped by late afternoon, and workers concentrated on cleaning up the spill.<br>Strong winds and prevailing currents meant oil would probably start washing on shore as early as Saturday.<br>Korea's coast guard sent dozens of ships to prevent the oil from reaching the shoreline.<br>The ecologically sensitive region is popular for its beaches and as a bird sanctuary.<br>Expert 3:<br>Friday morning, a barge under tow struck the Hebei Spirit oil supertanker, puncturing it and causing a 66,000-barrel crude oil leak off the west coast of South Korea near Taean.<br>Loose tow ropes, which broke in high wind and waves, probably caused the collision.<br>The leakage was stopped by Friday afternoon.<br>The South Korean government dispatched four helicopters, dozens of ships and hundreds of soldiers to contain the oil spill by setting up a 5-mile-long boom, scattering dispersants, and pumping up spilled oil and the remaining oil from the damaged tanker.<br>Oil reached the coastline of nearby Mallipo beach Saturday.<br>Expert 4:<br>On Dec. 7, 2007, a Hong Kong-registered oil tanker, the Hebei Spirit, spilled about 66,000 barrels of crude oil following a collision with a barge off the western coast of South Korea.<br>It was thought to be South Koreas largest maritime oil spill.<br>Officials, fearing environmental damage to the coast and to fisheries in the area, immediately dispatched dozens of vessels and four helicopters to the site to try to contain the spill.<br>In addition, the Defense Ministry sent 500 soldiers and four Navy boats to assist.<br>Some oil was reported to have reached the coast on the following day. |

It may be learned through a comparison between the content in Table 4 and the content in Table 5 that when the multi-document summary generated using the method provided in this application is applied to a same topic, content of the multi-document summary generated using the method is basically the same as content of the multi-document summary generated through manual labeling, and can cover a central idea of an original topic. Generated sentences are regular, and also meet a correct syntax rule.

The solutions provided in this application are described above mainly from a perspective of the multi-document summary generation apparatus. It may be understood that for implementing the foregoing functions, the multi-document summary generation apparatus includes corresponding hardware structures and/or software modules executing various functions. A person skilled in the art should be easily aware that, the multi-document summary generation apparatus and the method steps in each example described with reference to the embodiments disclosed in this specification can be implemented in a form of hardware or a combination of hardware and computer software in the present disclosure. Whether a function is implemented by hardware or in a manner of driving hardware by a computer software depends on a particular application and a design constraint of the technical solution. A person skilled in the art may use different methods to implement the described functions for each particular application, but it should not be considered that the implementation goes beyond the scope of this application.

In the embodiments of the present disclosure, function module division may be performed on the multi-document summary generation apparatus and the like based on the foregoing method example. For example, each function module may be obtained through division based on a corresponding function, or two or more functions may be integrated into one processing module. The integrated module may be implemented in a form of hardware, or may be implemented in a form of a software function module. It should be noted that, the module division in the embodiments of the present disclosure is an example and is only logical function division. There may be another division manner in an embodiment.

Figure 6:
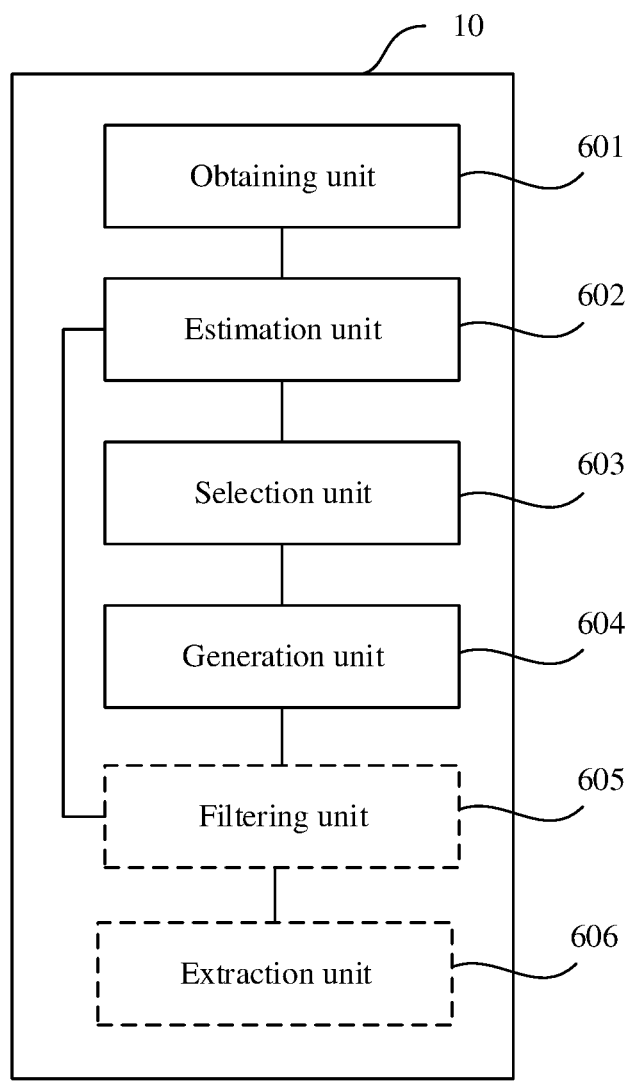
FIG. 6 is a schematic structural diagram 2 of a multi-document summary generation apparatus according to an embodiment of the present disclosure.

When each function module is obtained through division based on a corresponding function, FIG. 6 is a possible schematic structural diagram of the multi-document summary generation apparatus according to the foregoing embodiment. As shown in FIG. 6, the apparatus includes an obtaining unit 601, an estimation unit 602, a selection unit 603, and a generation unit 604. The obtaining unit 601 is configured to support the multi-document summary generation apparatus in performing steps S101 and S105 in the foregoing embodiment. The estimation unit 602 is configured to support the multi-document summary generation apparatus in performing steps S102, S106, S109 (which is specifically, for example, step S109a and step S109b) in the foregoing embodiment, and S111. The selection unit 603 is configured to support the multi-document summary generation apparatus in performing steps S103 and S110 (S110a and S110b) in the foregoing embodiment. The generation unit 604 is configured to support the multi-document summary generation apparatus in performing step S104 (which may be specifically S112, S113, and S114) in the foregoing embodiment. Certainly, the apparatus may further include a filtering unit 605 configured to support the multi-document summary generation apparatus in performing step S107 (which is specifically, for example, S107a and S107b) in the foregoing embodiment, and an extraction unit 606 configured to support the multi-document summary generation apparatus in performing step S108 in the foregoing embodiment.

It may be understood that the generation unit 604 in this embodiment of the present disclosure is the summary generation module 103 in the multi-document summary generation apparatus shown in FIG. 1, and the obtaining unit 601, the estimation unit 602, the selection unit 603, and the generation unit 604 are the importance estimation module 102 in the multi-document summary generation apparatus shown in FIG. 1.

Figure 7:
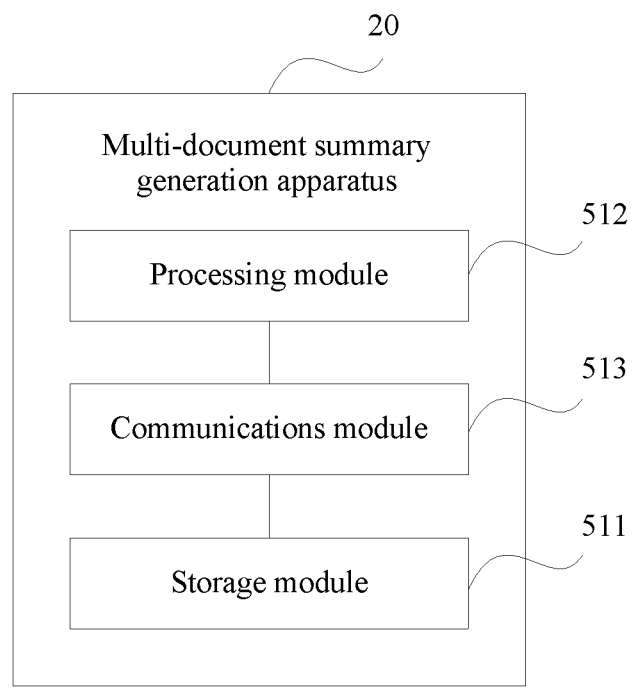
FIG. 7 is a schematic structural diagram 3 of a multi-document summary generation apparatus according to an embodiment of the present disclosure.

When an integrated unit is used, FIG. 7 is a possible schematic diagram of a logical structure of the multi-document summary generation apparatus in the foregoing embodiment. The multi-document summary generation apparatus includes a processing module 512 and a communications module 513. The processing module 512 is configured to control and manage actions of the multi-document summary generation apparatus. For example, the processing module 512 is configured to perform steps S101, S105, S102, S106, S109 (which is specifically, for example, step S109a and step S109b), S111, S103, S110 (S110a and S110b), step S104 (which may be specifically S112, S113, and S114), step S107 (which is specifically, for example, S107a and S107b), and step S108 in the foregoing embodiment, and/or perform another process of the technology described in this specification. The communications module 513 is configured to support communication between the multi-document summary generation apparatus and another device. The multi-document summary generation apparatus may further include a storage module 511 configured to store program code and data of the multi-document summary generation apparatus.

The processing module 512 may be a processor or controller, for example, the processing module may be a central processing unit, a general-purpose processor, a digital signal processor, an application-specific integrated circuit, a field programmable gate array or another programmable logical device, a transistor logical device, a hardware component, or any combination thereof. The processing module 512 can implement or execute various examples of logical blocks, modules, and circuits that are described with reference to the content disclosed in the present disclosure. The processor may be alternatively a combination, for example, a combination including one or more microprocessors or a combination of a digital signal processor and a microprocessor, for implementing a computing function. The communications module 513 may be a communications interface or the like. The storage module 511 may be a memory.

Figure 8:
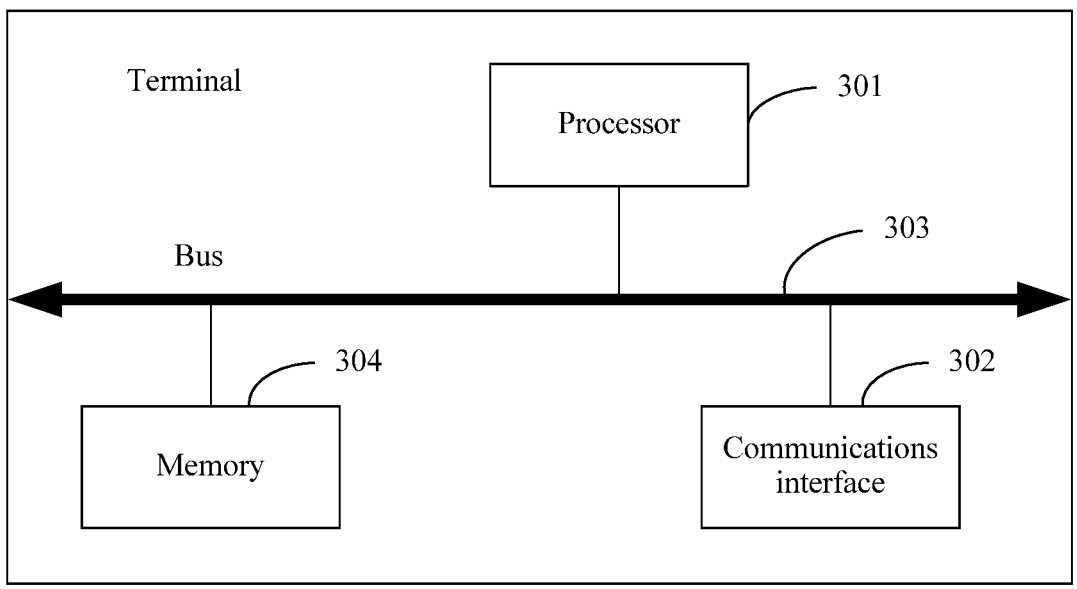
FIG. 8 is a schematic structural diagram of a terminal according to an embodiment of the present disclosure.

When the processing module 512 is a processor, the communications module 513 is a communications interface, and the storage module 511 is a memory, the multi-document summary generation apparatus in this embodiment of the present disclosure may be a terminal shown in FIG. 8.

FIG. 8 is a schematic structural diagram of a terminal according to an embodiment of the present disclosure. It may be learned from FIG. 8 that the terminal includes a processor 301, a communications interface 302, a memory 304, and a bus 303. The communications interface 302, the processor 301, and the memory 304 are interconnected using the bus 303. The bus 303 may be a peripheral component interconnect (PCI) bus, an extended industry standard architecture (EISA) bus, or the like. The bus may be classified into an address bus, a data bus, a control bus, and the like. For ease of indication, the bus is indicated using only one bold line in FIG. 8. However, it does not indicate that there is only one bus or only one type of bus. The memory 304 is configured to store program code and data of the terminal. The communications interface 302 is configured to support the terminal in communicating with another device, and the processor 301 is configured to support the terminal in executing the program code and the data stored in the memory 304 in order to implement the multi-document summary generation method provided in this embodiment of the present disclosure.

According to one aspect, an embodiment of the present disclosure provides a computer-readable storage medium. The computer-readable storage medium stores an instruction. When the computer-readable storage medium runs on a terminal, the multi-document summary generation apparatus performs steps S101, S105, S102, S106, S109 (which is specifically, for example, step S109a and step S109b), S111, S103, S110 (S110a and S110b), step S104 (which may be specifically S112, S113, and S114), step S107 (which is specifically, for example, S107a and S107b), and step S108 in the foregoing embodiment.

The foregoing descriptions about implementations allow a person skilled in the art to clearly understand that, for the purpose of convenient and brief description, division of the foregoing function modules is used as an example for illustration. In an embodiment, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-document summary generation method, comprising:
   obtaining a candidate sentence set comprising a plurality of candidate sentences included in each candidate document of a plurality of candidate documents about an event;
   processing each of the candidate sentences using a cascaded attention mechanism and an unsupervised learning model in a preset network model to obtain an importance of each of the candidate sentences, wherein an importance of a candidate sentence corresponds to a modulus of a row vector in a cascaded attention mechanism matrix, wherein the preset network model optimizes, based on each of the candidate sentences, m vectors describing the event, and a candidate matrix, a reconstruction error function from the unsupervised learning model to output the cascaded attention mechanism matrix, wherein the importance of the candidate sentence indicates an importance degree of a meaning from the candidate sentence in the candidate documents, wherein the reconstruction error function comprises a relationship between each of the candidate sentences, the m vectors, the candidate matrix, and a weight corresponding to the candidate matrix, wherein the candidate matrix is an m×n matrix, wherein m and n are positive integers, and wherein n is a quantity of words comprised in the candidate documents;
   selecting, from the candidate sentence set based on the importance of each of the candidate sentences, a phrase that meets a preset condition as a summary phrase set; and
   obtaining a summary of the candidate documents based on the summary phrase set.

2. The multi-document summary generation method of claim 1, wherein the optimizing further comprises:
   executing the unsupervised learning model; and
   using the modulus of a row vector from the cascaded attention mechanism matrix to obtain the importance of each of the candidate sentences, and wherein the modulus of a row vector is the importance of the candidate sentence in a case of a minimum value of the reconstruction error function.

3. The multi-document summary generation method of claim 1, wherein the selecting comprises:
   filtering out, from the candidate sentences, a word that does not meet a preset rule in each of the candidate sentences to obtain each filtered candidate sentence;
   extracting a first part-of-speech phrase and a second part-of-speech phrase from a syntax tree of each of the filtered candidate sentences to constitute a phrase set;
   calculating, based on an importance of each of the filtered candidate sentences, an importance of the first part-of-speech phrase and an importance of the second part-of-speech phrase; and
   selecting, from the phrase set and based on the importance of the first part-of-speech phrase and the importance of the second part-of-speech phrase, the first part-of-speech phrase and the second part-of-speech phrase that meet the preset condition as the summary phrase set.

4. The multi-document summary generation method of claim 3, wherein the filtering comprises:
   filtering out noise in each of the candidate sentences to obtain a candidate word set corresponding to each of the candidate sentences, wherein each of the candidate sentences comprises a plurality of words, and wherein a plurality of importance corresponds to the words; and
   filtering out, based on the importance of each of the words, a word whose importance is less than a preset threshold in the candidate word set to obtain each of the filtered candidate sentences.

5. The multi-document summary generation method of claim 4, wherein before filtering out the word whose importance is less than the preset threshold in the candidate word set, the method further comprises processing each of the candidate sentences using the cascaded attention mechanism and the unsupervised learning model in the preset network model to obtain an importance of each of a plurality of different words, wherein the candidate documents comprise the different words.

6. The multi-document summary generation method of claim 5, wherein processing each of the candidate sentences using the cascaded attention mechanism and the unsupervised learning model in the preset network model to obtain the importance of the different words comprises optimizing, based on each of the candidate sentences, the m vectors used to describe the event, a candidate matrix, and the reconstruction error function, and wherein the optimizing further comprises:
  executing the unsupervised learning model; and
  using a modulus of a column vector of each column in the candidate matrix as the importance of the words when the reconstruction error function has a minimum value.

7. The multi-document summary generation method of claim 3, wherein calculating, based on the importance of the candidate sentence, the importance of the first part-of-speech phrase and the importance of the second part-of-speech phrase that are extracted from each of the candidate sentences comprises:
  obtaining a word frequency of the first part-of-speech phrase and the second part-of-speech phrase; and
  calculating, based on the word frequency of the first part-of-speech phrase, the second part-of-speech phrase and the importance of the candidate sentence in which the first part-of-speech phrase and the second part-of-speech phrase are located, the importance of the first part-of-speech phrase and the importance of the second part-of-speech phrase.

8. The multi-document summary generation method of claim 3, wherein selecting from the phrase set, based on the importance of the first part-of-speech phrase and the second part-of-speech phrase that correspond to each of the filtered candidate sentences, the first part-of-speech phrase and the second part-of-speech phrase that meet the preset condition as the summary phrase set, comprises:
  inputting the importance of the first part-of-speech phrase and the second part-of-speech phrase and similarity between the first part-of-speech phrase and the second part-of-speech phrase into an integer linear programming function;
  determining a candidate weight of the first part-of-speech phrase and the second part-of-speech phrase and a correlation weight of the similarity between the first part-of-speech phrase and the second part-of-speech phrase when an extremum is taken for the integer linear programming function, wherein the candidate weight of the first part-of-speech phrase or the second part-of-speech phrase is used to determine whether the first part-of-speech phrase or the second part-of-speech phrase meets the preset condition, wherein the correlation weight is used to determine whether similar phrases are simultaneously selected; and
  determining, based on the candidate weight of the first part-of-speech phrase and the second part-of-speech phrase and the correlation weight of the similarity between the first part-of-speech phrase and the second part-of-speech phrase, a third part-of-speech phrase that meets the preset condition.

9. A multi-document summary generation apparatus, comprising:
  a memory configured to store computer instructions; and
  a processor coupled to the memory and configured to execute the computer instructions, which cause the multi-document summary generation apparatus to be configured to:
    obtain a candidate sentence set comprising a plurality of candidate sentences included in each candidate document of a plurality of candidate documents about an event;
    process each of the candidate sentences in the candidate sentence set using a cascaded attention mechanism and an unsupervised learning model in a preset network model to obtain the importance of each of the candidate sentences, wherein the importance of a candidate sentence corresponds to a modulus of a row vector in a cascaded attention mechanism matrix, wherein the preset network model optimizes, based on each of the candidate sentences, m vectors describing the event, and a candidate matrix, a reconstruction error function from the unsupervised learning model to output the cascaded attention mechanism matrix, wherein the importance of the candidate sentence indicates an importance degree of a meaning from the candidate sentence in the candidate documents, wherein the reconstruction error function comprises a relationship between each of the candidate sentences, the m vectors describing the event, the candidate matrix, and a weight corresponding to the candidate matrix, wherein the candidate matrix is an m×n matrix, wherein m and n are positive integers, and wherein n is a quantity of words comprised in the candidate documents;
    select, from the candidate sentence set based on the importance of each of the candidate sentences, a phrase that meets a preset condition as a summary phrase set; and
    obtain a summary of the candidate documents based on the summary phrase set.

10. The multi-document summary generation apparatus of claim 9, wherein the computer instructions further cause the multi-document summary generation apparatus to be configured to:
  execute the unsupervised learning model; and
  use the modulus of a row vector from the cascaded attention mechanism matrix to obtain the importance of each of the candidate sentences, wherein the modulus of a row vector is the importance of the candidate sentence when the reconstruction error function is a minimum value.

11. The multi-document summary generation apparatus of claim 9, wherein the computer instructions further cause the multi-document summary generation apparatus to be configured to:
  filter out a word that does not meet a preset rule in each of the candidate sentences to obtain each filtered candidate sentence;
  extract a first part-of-speech phrase and a second part-of-speech phrase from a syntax tree of each of the filtered candidate sentences to constitute a phrase set,
  calculate, based on the importance of each of the filtered candidate sentences, an importance of the first part-of-speech phrase and the second part-of-speech phrase that are extracted from each of the filtered candidate sentences; and
  select, from the phrase set based on the importance of the first part-of-speech phrase and the second part-of-speech phrase that correspond to each of the filtered candidate sentences, the first part-of-speech phrase and the second part-of-speech phrase that meet the preset condition as the summary phrase set.

12. The multi-document summary generation apparatus of claim 11, wherein the computer instructions further cause the multi-document summary generation apparatus to be configured to:
filter out noise in each of the candidate sentences to obtain a candidate word set corresponding to each of the candidate sentences, wherein each of the candidate sentences comprises a plurality of words, and wherein a plurality of importance corresponds to the words; and
filter out, based on an importance of each of the words, a word whose importance is less than a preset threshold in the candidate word set to obtain each of the filtered candidate sentences.

13. The multi-document summary generation apparatus of claim 12, wherein the computer instructions further cause the multi-document summary generation apparatus to be configured to train process each of the candidate sentences using the cascaded attention mechanism and the unsupervised learning model in the preset network model to obtain the importance of each of a plurality of different words, and wherein the candidate documents comprise the different words.

14. The multi-document summary generation apparatus of claim 13, wherein the computer instructions further cause the multi-document summary generation apparatus to be configured to optimize, based on each of the candidate sentences, the m vectors used to describe the event, and a candidate matrix, the reconstruction error function, comprising:
executing the unsupervised learning model; and
using a modulus of a column vector of each column in the candidate matrix as the importance of the words when the reconstruction error function has a minimum value.

15. The multi-document summary generation apparatus of claim 11, wherein the computer instructions further cause the multi-document summary generation apparatus to be configured to:
obtain a word frequency of the first part-of-speech phrase and the second part-of-speech phrase; and
calculate, based on the word frequency of the first part-of-speech phrase, the second part-of-speech phrase and the importance of the candidate sentence in which the first part-of-speech phrase and the second part of speech phrase are located, the importance of the first part-of-speech phrase and the second part-of-speech phrase .

16. The multi-document summary generation apparatus of claim 15, wherein the computer instructions further cause the multi-document summary generation apparatus to be configured to:
input the importance of the first part-of-speech phrase and the second part-of-speech phrase and similarity between the first part-of-speech phrase and the second part-of-speech phrase into an integer linear programming function;
determine a candidate weight of the first part-of-speech phrase and the second part-of-speech phrase and a correlation weight of the similarity between the first part-of-speech phrase and the second part-of-speech phrase when an extremum is taken for the integer linear programming function, wherein the candidate weight of the first part-of-speech phrase and the second part-of-speech phrase is used to determine whether the first part-of-speech phrase and the second part-of-speech phrase meet the preset condition, wherein the correlation weight is used to determine whether similar phrases are simultaneously selected; and determine, based on the candidate weight of the first part-of-speech phrase and the second part-of-speech phrase and the correlation weight of the similarity between the first part-of-speech phrase and the second part-of-speech phrase, a third part-of-speech phrase that meets the preset condition.

17. A computer program product comprising computer-executable instructions stored on a non-transitory computer-readable medium that, when executed by a processor, cause an apparatus to:
obtain a candidate sentence set comprising a plurality of candidate sentences included in each candidate document of a plurality of candidate documents about an event;
process each of the candidate sentences using a cascaded attention mechanism and an unsupervised learning model in a preset network model to obtain an importance of each of the candidate sentences, wherein an importance of a candidate sentence corresponds to a modulus of a row vector in a cascaded attention mechanism matrix, wherein the preset network model optimizes, based on each of the candidate sentences, m vectors describing the event, and a candidate matrix, a reconstruction error function from the unsupervised learning model to output the cascaded attention mechanism matrix, wherein the importance of the candidate sentence indicates an importance degree of a meaning from the candidate sentence in the candidate documents, wherein the reconstruction error function comprises a relationship between each of the candidate sentences, m vectors describing the event, a candidate matrix, and a weight corresponding to the candidate matrix, wherein the candidate matrix is an m×n matrix, wherein m and n are positive integers, and wherein n is a quantity of words comprised in the candidate documents;
select, from the candidate sentence set based on the importance of each of the candidate sentences, a phrase that meets a preset condition as a summary phrase set; and
obtain a summary of the candidate documents based on the summary phrase set.

18. The computer program product of claim 17, wherein the computer-executable instructions further cause the apparatus to:
execute the unsupervised learning model; and
use the modulus of a row vector from the cascaded attention mechanism matrix to obtain the importance of each of the candidate sentences, wherein the modulus of a row vector is the importance of the candidate sentence when the reconstruction error function is a minimum value.

19. The computer program product of claim 17, wherein the computer-executable instructions further cause the apparatus to:
filter out, from the candidate sentences, a word that does not meet a preset rule in each of the candidate sentences to obtain each filtered candidate sentence;
extract a first part-of-speech phrase and a second part-of-speech phrase from a syntax tree of each of the filtered candidate sentences to constitute a phrase set, calculate, based on an importance of each of the filtered candidate sentences, an importance of the first part-of-speech phrase and the second part-of-speech phrase that are extracted from the candidate sentences; and
select, from the phrase set and based on the importance of the first part-of-speech phrase and the second part-ofspeech phrase that correspond to the candidate sentence, the first part-of-speech phrase and the second part-of-speech phrase that meet the preset condition as the summary phrase set.

20. The computer program product of claim 19, wherein the computer-executable instructions further cause the apparatus to:
- filter out noise in each of the candidate sentences to obtain a candidate word set corresponding to each of the candidate sentences, wherein each of the candidate sentences comprises a plurality of words, wherein a plurality of importance corresponds to the words; and
- filter out, based on an importance of each of the words, a word whose importance is less than a preset threshold in the candidate word set to obtain each of the filtered candidate sentences.

* * * * *